US008502057B2

(12) United States Patent
Ikeya et al.

(10) Patent No.: US 8,502,057 B2
(45) Date of Patent: Aug. 6, 2013

(54) ELECTRONIC MUSICAL INSTRUMENT

(75) Inventors: Tadahiko Ikeya, Hamamatsu (JP); Yuxin Zheng, Hamamatsu (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 13/331,169

(22) Filed: Dec. 20, 2011

(65) Prior Publication Data

US 2012/0152088 A1 Jun. 21, 2012

(30) Foreign Application Priority Data

Dec. 20, 2010 (JP) ................................. 2010-283001
Dec. 20, 2010 (JP) ................................. 2010-283002

(51) Int. Cl.
*G01H 7/00* (2006.01)

(52) U.S. Cl.
USPC .......................... 84/612; 84/470 R; 84/477 R

(58) Field of Classification Search
USPC .................... 84/464 R, 464 A, 470 R, 477 R, 84/612, 636
See application file for complete search history.

(56) References Cited

U.S. PATENT DOCUMENTS

| | | | | |
|---|---|---|---|---|
| 4,402,244 A * | 9/1983 | Nakada et al. | 84/612 |
| 4,651,612 A * | 3/1987 | Matsumoto | 84/650 |
| 5,266,735 A * | 11/1993 | Shaffer et al. | 84/609 |
| 5,286,909 A | 2/1994 | Shibukawa | |
| 6,342,663 B1 * | 1/2002 | Kato | 84/470 R |

FOREIGN PATENT DOCUMENTS

| | | |
|---|---|---|
| JP | 2707853 B2 | 2/1998 |
| JP | 2004101979 A | 4/2004 |

OTHER PUBLICATIONS

Yamaha Corporation, Portatone EZJ-210 Manual, p. 32. http://www2.yamaha.co.jp/manual/pdf/emi/japan/port/ezj210_ja_om_a0.pdf. (will be provided with a supplemental information disclosure statement), Dec. 20, 2011.

Yamaha Corporation, Portatone EZJ-210 Manual, p. 32. http://www2.yamaha.co.jp/manual/pdf/emi/japan/port/ezj210_ja_om_a0.pdf, Mar. 28, 2012.

Yamaha Corporation, Portatone EZ-200 Manual (which is similar to Portatone EZJ-210 Manual cited above), Mar. 28, 2012.

* cited by examiner

*Primary Examiner* — Jeffrey Donels
(74) *Attorney, Agent, or Firm* — Rossi, Kimms & McDowell LLP

(57) ABSTRACT

By a musical performance guide which is in "waiting mode" with a "tempo-follow" enabled setting, an electronic musical instrument illuminates a guide lamp at a point in time which is earlier by a tone-generation start allowable period Ta than the note-on timing of a musical tone of a melody part of automatic musical performance data to start musical performance guide. The tone-generation start allowable period Ta is an allowable time #2 which is sufficiently longer than that of a case of a tempo-follow disabled setting. When a user has depressed a correct key within the tone-generation start allowable period Ta, the electronic musical instrument starts generating a melody tone to move the position of the automatic musical performance data which is to be reproduced forward.

15 Claims, 10 Drawing Sheets

ELECTRONIC MUSICAL INSTRUMENT

BACKGROUND OF THE INVENTION

1. Field of the Invention

The present invention relates to an electronic musical instrument which provides a user with musical performance guide by indicating a musical performance operating element that the user is expected to play by use of musical performance data.

2. Description of the Related Art

Although a beginner desires to play a song on the electronic musical instrument, he or she is not sure which note should be played and when and how long the note should be played. Conventionally, there are electronic musical instruments having a musical performance guide capability for reproducing musical performance data of the user's desired song and indicating the note the user should play on a display or by a guide lamp. The conventional electronic musical instruments having such a musical performance guide capability are described in the following documents 1 to 3:

Document 1: Japanese Patent Publication No. 2707853

Document 2: Japanese Unexamined Patent Publication No. 2004-101979

Document 3: Yamaha Corporation, PORTATONE EZJ-210 Manual, p. 32, http://www2.yamaha.co.jp/manual/pdf/emi/japan/port/ezj210_ja_om_a0.pdf (searched on Dec. 8, 2010).

By the musical performance guide capability of the conventional electronic musical instrument, when a song which a user desires to practice is reproduced to reach the timing at which the user is supposed to play, the electronic musical instrument indicates a key corresponding to a note which the user is supposed to play, so that the user learns on his own which note should be played and when the note should be played. Conventionally, furthermore, there is a musical performance guide capability by which, if an indicated key has not been played by the user at certain timing, the electronic musical instrument enters a waiting state to wait until the indicated key is played by the user. In this waiting state, the electronic musical instrument suspends the reading of musical performance data which is done in accordance with the progression of the song, and waits until the user plays the indicated key. When the user plays the indicated key, the electronic musical instrument generates a musical tone corresponding to the played key, and starts reading the following musical performance data to resume the reproduction of the song.

The operation of the conventional musical performance guide will be explained with an example of a keyboard musical instrument, referring to FIG. 8.

On the top row of FIG. 8, notes indicative of automatic musical performance data of a song which the user is to play are arranged in time sequence. On a row situated below the top row, note lengths of the respective notes indicated on the top row are indicated as long rectangles. On a row situated below the second row, key-depression periods each ranging from user's depression of a key corresponding to an above-described note to user's release of the key are indicated as long rectangles. In FIG. 8, however, note numbers of the respective notes are not shown. In FIG. 8, times t1, t2, t3, t4, t5 . . . are the times at which respective beats start. More specifically, each interval between the times is equivalent to a beat. The timing at which the first quarter note n1 indicative of the automatic musical performance data is expected to be generated is time t1. The timing at which the second quarter note n2 is expected to be generated is time t2. The timing at which the third half-note n3 is expected to be generated is time t3.

When the musical performance guide capability which the user can switch between on and off is turned on by the user for playing a song, automatic musical performance data is read out in sequence. At time t01 which is earlier by a certain period of time T than the time t1 at which the quarter note n1 is expected to generate, a guide lamp indicating a key having the tone pitch of the quarter note n1 is illuminated. Assume that even though the guide lamp had been illuminated at the time t01, the user has not depressed the key indicated by the guide lamp by the tone generation timing t1. As a result, the electronic musical instrument enters the waiting state to suspend the reading of the musical performance data to wait until the user depresses the indicated key. Assume that the user depresses the key indicated by the guide lamp at time t1' which is later than the time t1. By the depression of the key, the guide lamp is distinguished, while the generation of a musical tone having the tone pitch of the depressed key starts at the time t1' to keep generating the tone until the release of the key. In addition, the electronic musical instrument cancels the waiting state to read out the next musical performance data to prepare for the guide for the next quarter note n2. A period ranging from the time t01 to the time t1 is the certain period T, which is a short period equivalent to the note length of a thirty-second note, for example. In a case where the user has depressed a key different from the key indicated by the guide lamp, the electronic musical instrument judges the key-depression to be a failed depression, so that the electronic musical instrument considers that the correct key-depression has not been made by the time t1 to enter the waiting state to wait until the correct depression of the indicated key.

As described above, in the case where the key which is indicated by the guide lamp and corresponds to the tone pitch of the quarter note n1 is depressed by the user, the next automatic musical performance data is read out, with time t20 which is later by one beat than the time t1' at which the key corresponding to the quarter note n1 has been depressed being defined as the timing at which the quarter note n2 is expected to generate. At a point in time which is earlier by the certain period T than the time t20, therefore, the guide lamp indicating a key corresponding to the tone pitch of the quarter note n2 is illuminated to offer the musical performance guide for the quarter note n2. As for the musical performance data for the quarter note n2 and the half note n3 as well, at respective points in time which are earlier by the certain period T than the respective times at which musical tones of the respective notes are expected to generate, the guide lamps indicating respective keys corresponding to the tone pitches of the notes n2, n3 are illuminated to offer the musical performance guide for the respective notes. In the case of FIG. 8, in spite of such a guide being offered for the user, the user has not depressed the keys indicated by the guide lamps by the respective tone-generation timings of the notes n2, n3. As a result, the electronic musical instrument enters the waiting state at the respective tone-generation timings of the notes n2, n3. The user then depresses the key corresponding to the quarter note n2 at time t2' which is later than the tone-generation timing t20, so that the waiting state is canceled. Furthermore, the user depresses the key corresponding to the half note n3 at time t3' which is later than the tone-generation timing t30, so that the waiting state is canceled. By the correct key-depression which leads to the cancel of the waiting state, the generation of a musical tone having the tone pitch of the guided note, that is, having the tone pitch of the depressed key starts to keep the generated musical tone until the release of the key, while the next musical performance data is read out to prepare for the guide for the next note.

By the above-described guide capability, immediately before the timing at which the user is expected to depress a key during the reproduction of a song which the user desires to practice, the electronic musical instrument provides the user with the guide which indicates the key that the user is expected to depress. If the user has not depressed the guided key by the originally set tone-generation timing, the electronic musical instrument enters the waiting state. If the user then depresses the guided key, the electronic musical instrument resumes the reproduction of the song. A corresponding musical tone will be generated for a period ranging from the depression of the key to the release of the key. This guide capability indicates only the note which should be depressed and the timing at which the key should be depressed, but does not indicate the timing at which the key should be released. Therefore, the conventional guide capability is disadvantageous in that if the user releases the key excessively early, the period during which the corresponding tone is generated is too short, ending up with interrupted musical performance.

In order to resolve this disadvantage, there is a conventional musical performance guide capability which enables the user to learn the timing at which keys should be released as well. By this conventional musical performance guide capability, regardless of the timing at which the user releases a key, the generation of a musical tone corresponding to the key is maintained until the note length of a note recorded in song data has passed, while the generation of the musical tone automatically stops when the note length of the note has passed. By the conventional musical performance guide, therefore, even if the user fails to release the key at the correct timing, the song played by the user sounds well. By repeatedly practicing the song by use of this musical performance guide capability, furthermore, the user can learn when to release keys.

The operation of this conventional musical performance guide will be explained with reference to FIG. 9. In FIG. 9 as well, an example of a keyboard musical instrument will be described.

On the top row of FIG. 9, notes indicative of automatic musical performance data of a song which the user is to play are arranged in time sequence. On a row situated below the top row, note lengths of the respective notes indicated on the top row are indicated as long rectangles. On a row situated below the second row, periods each ranging from user's depression of a key corresponding to an above-described note to user's release of the key are indicated as long rectangles. In FIG. 9, times t1, t2, t3, t4, . . . are the times at which respective beats start. More specifically, each interval between the times is equivalent to a beat. The timing at which the first quarter note n10 indicative of the automatic musical performance data is expected to be generated is time t1. The timing at which the second quarter note n11 is expected to be generated is time t2. The timing at which the third quarter note n12 is expected to be generated is time t3. The timing at which the fourth quarter note n13 is expected to be generated is time t4. The note length of the quarter note n10 is ta1. The note length of the quarter note n11 is ta2. The note length of the quarter note n12 is ta3. The note length of the quarter note n13 is ta4. Because each of the notes n10 to n13 is a quarter note, the respective note lengths ta1 to ta4 have the same length.

In a case where the user starts musical performance with the musical performance guide being switched to on, automatic musical performance data is read out in sequence, while at a point in time which is not shown but is earlier by a certain period of time than the time t1 at which the quarter note n10 is expected to be generated, a guide lamp indicative of a key corresponding to the tone pitch of the quarter note n10 is illuminated. Assume that the user recognizes the illuminated guide lamp and depresses the key indicated by the guide lamp at the time t1 to keep depressing the key for a period tb1. In this case, although the period tb1 is shorter than the note length ta1 of the quarter note n10, the length of an actually generated musical tone is prolonged to have the note length ta1. In the case where the key corresponding to the tone pitch of the quarter note n10 indicated by the guide lamp has been depressed, the next automatic musical performance data is read out to illuminate a guide lamp indicating a key corresponding to the tone pitch of the quarter note n11 at a point in time which is earlier by the certain period than the timing t2 at which the quarter note n11 is expected to be generated. Assume that the user similarly depresses the key indicated by the guide lamp at the time t2 to keep depressing the key for a period tb2. In this case, although the period tb2 is shorter than the note length ta2 of the quarter note n11, the length of an actually generated musical tone is prolonged to have the note length ta2. In the case where the key indicated by the guide lamp and corresponding to the tone pitch of the quarter note n11 is played, furthermore, the next automatic performance data is read out, while a guide lamp indicating a key corresponding to the tone pitch of the quarter note n12 is illuminated at a point in time which is earlier by the certain period of time than the time t3 at which the quarter note n12 is expected to be generated. Assume that the user similarly depresses the key indicated by the guide lamp at the time t3 to keep depressing the key for a period tb3. In this case, although the period tb3 is longer than the note length ta3 of the quarter note n12, the length of an actually generated musical tone is shrunk to have the note length ta3.

By this conventional musical performance guide capability, therefore, the respective musical tones are kept being generated for the respective note lengths recorded in the song data regardless of the respective timing at which the user has actually released the respective keys.

SUMMARY OF THE INVENTION

In the case of the conventional musical performance guide indicated in FIG. 8, if a guided key has not been depressed by the user even after the timing at which the guided note is expected to be generated, the electronic musical instrument enters the waiting state to wait until the indicated key is depressed by the user. When the key indicated by the musical performance guide is depressed, the electronic musical instrument starts generating a musical tone corresponding to the depressed key. By this conventional musical performance guide, at a point in time which is earlier by the certain period T than the timing at which the user is expected to depress a key during the reproduction of a song which the user desires to learn, a note which the user is expected to play is guided so that the user can depress a key corresponding to the guided note. In this case, the certain period T is set at a short period of time such as the note length of a thirty-second note, for example. Because the certain period T is short, the conventional musical performance guide enables the user to precisely play the song only by depressing the keys at indicated timing. On the other hand, however, the user has to wait for the next indication of a key which the user is expected to depress. If the user who had already known the next key to be played has depressed the key which would be indicated next at a point which is earlier than the certain period T as shown on the lowest row of FIG. 8, such a user's key-depression is judged to be a failed key-depression. In this case, therefore, in spite of the fact that the user plays the correct note as indicated in a musical score, if the user plays the note faster than allowed by the musical performance guide, musical tones of the notes which the user has played earlier than expected will not be generated.

As in the case of FIG. 9, in addition, if the user depresses, at the time t3, a key corresponding to the quarter note n12 indicated by the guide lamp to keep depressing the key for the period tb3 which is longer than one beat, a point in time at which the period tb3 ends is later than the time t4 which is the timing at which the next quarter note n13 is expected to be generated. Although the musical performance guide for the quarter note n13 starts at a point in time which is earlier by the certain period T than the time t4, the user is to depress a key corresponding to the note n13 after the period tb3 completes. In this case, the generation of the musical tone of the note n12 is automatically canceled at a point in time which is equivalent to the end of the note length ta3, so that the song played by the user enters the waiting state at the time t4. When the user depresses a key corresponding to the note n13 at time t4' which is later by a time Dt than the time t4, the song is resumed at the time t4'. In the case, the user depresses the key indicated by the guide lamp at time t4' to keep depressing the key for a period tb4. Although the period tb4 is shorter than the note length ta4 of the quarter note n13, the length of an actually generated musical tone is prolonged to have the length of the note length ta4. Even if the time t4' at which a beat starts is delayed, the electronic musical instrument keeps the tempo which determines the length of a beat constant. Therefore, the length between the respective times t4', t5', t6' . . . of respective beats which follow the time t4' will not vary.

By the conventional musical performance guide shown in FIG. 9, as described above, the tempo is constant regardless of the timings at which the user actually releases keys. More specifically, even if the user releases a key early with the intention of playing the song lightly, the conventional musical performance guide makes the user wait a long time without moving forward the guide for the next beat. In addition, even if the user releases a key late with the intention of playing the song slowly, the conventional musical performance guide starts the guide for the next beat even before the release of the key without delaying the guide for the next beat. Therefore, the conventional musical performance guide is not user-friendly.

As described above, the electronic musical instruments having the conventional guide capabilities are disadvantageous in that the conventional guide capabilities cannot satisfy user demand not only to play a song as indicated by the guide but also to play fast and lightly or to play slowly with emotion.

Therefore, the present invention was accomplished to solve the above-described problem, and an object thereof is to provide an electronic musical instrument having a musical performance guide which satisfies user demand not only to play a song as indicated by the guide but also to play fast and lightly or to play slowly with emotion.

In order to achieve the above-described object, it is a feature of the present invention to provide an electronic musical instrument comprising a storage portion for storing musical performance data of a first part of song; a reading portion for reading out the musical performance data of the first part from the storage portion in accordance with progression of the song; an indication portion for indicating, in accordance with the musical performance data of the first part read out by the reading portion in order to be played by a user, a musical performance operating element which is included in a plurality of musical performance operating elements and should be manipulated by the user; a setting portion for setting, for each musical tone which is to be generated on the basis of the musical performance data of the first part read out by the reading portion, a certain period of time as a tone-generation start allowable period which is earlier than tone-generation timing at which the musical tone is expected to be generated; a musical performance determination portion for determining whether the musical performance operating element indicated by the indication portion has been correctly manipulated on or after start timing at which the tone-generation start allowable period set by the setting portion starts; a tempo-follow portion for changing a tempo of the song in accordance with timing at which the musical performance operating element is manipulated; and a suspension portion for instructing generation of a musical tone signal corresponding to the manipulated musical performance operating element when the musical performance determination portion has determined that the musical performance operating element indicated by the indication portion had been manipulated correctly on or after the start timing, and suspending, when the musical performance determination portion has determined that the musical performance operating element indicated by the indication portion had not been correctly manipulated by the tone-generation timing even though the start timing had already passed, the reading of the musical performance data of the first part by the reading portion until the musical performance determination portion determines that the musical performance operating element has been correctly manipulated.

According to the present invention, by the combination of the tone-generation start allowable period which is the certain period of time provided earlier than the tone-generation timing, and the tempo-follow capability, the electronic musical instrument judges a user's key-depression made earlier than the tone-generation timing to be a correct key-depression, and changes the tempo of a reproduced song so that the tempo can follow the timing at which the user manipulates the musical performance operating element to play the song. More specifically, regardless of whether the user's key-depression is earlier or slower than the tone-generation timing, the electronic musical instrument of the present invention judges the user's key-depression to be correct, and controls the tempo of the song in accordance with the user's correct key-depression. Therefore, the electronic musical instrument of the present invention satisfies the user demand not only to play a song as indicated by the guide but also to play fast and lightly or to play slowly with emotion.

According to the present invention, furthermore, by changing the length of the tone-generation start allowable period by switching the tempo-follow portion between on and off, the user is able to practice the electronic musical instrument more effectively. By setting the short tone-generation allowable period for the case where the tempo-follow portion is in off-state, the electronic musical instrument guides a user by indicating keys to depress at accurate timing at a constant tempo, so that the electronic musical instrument of the present invention also satisfies a user of a low level of proficiency who desires to learn the timing to depress the keys. As for the long tone-generation allowable period of a case where the tempo-follow portion is in on-state, the longer the tone-generation allowable period is, the earlier the user is allowed to depress keys, resulting in musical performance played at a user's desired speed.

It is the other feature of the present invention to provide an electronic musical instrument comprising, in addition to the above-described storage portion, reading portion, indication portion, setting portion and musical performance determination portion, a manipulation timing storage portion for storing manipulation timing of the musical performance operating element determined by the musical performance determination portion that the musical performance operating element has been manipulated correctly; a tempo control portion for controlling a tempo at which the musical performance data of the song is reproduced in accordance with the manipulation timing stored in the manipulation timing storage portion; a switching portion for switching the tempo control portion between enabled and disabled states; a tone-generation stop process control portion for stopping generating a currently generated musical tone in accordance with completed manipulation of the musical performance operating element when the tempo control portion is set in the enabled state by the switching portion, and stopping generating the currently generated musical tone in accordance with note-off information included in the musical performance data of the first part when the tempo control portion is set in the disabled state by the switching portion; and a suspension portion for instructing generation of a musical tone signal corresponding to the manipulated musical performance operating element when the musical performance determination portion has determined that the musical performance operating element indicated by the indication portion had been manipulated correctly on or after the start timing, and suspending, when the musical performance determination portion has determined that the musical performance operating element indicated by the indication portion had not been correctly manipulated by the tone-generation timing even though the start timing had already passed, the reading of the musical performance data of the first part by the reading portion until the musical performance determination portion determines that the musical performance operating element has been correctly manipulated.

For a user of a low level of proficiency, according to this feature, by switching the tempo control portion to the disabled state, the electronic musical instrument stops generation of musical tones not by user's release of keys but by note-off events of song data of a reproduced song, so that the user can learn how long respective musical tones should be played. Because the song is reproduced at a constant tempo, furthermore, the user can learn the timing at which the user should depress the musical performance operating elements. For a user of a high level of proficiency, furthermore, by switching the tempo control portion to the enabled state, the electronic musical instrument stops generation of a currently generated musical tone by user's completed manipulation of the musical performance operating element, that is, by user's release of the corresponding key, so that the user can determine the timing of depression of the next key to play the song at a user's desired speed. Furthermore, the electronic musical instrument having this feature allows the user to determine the key-depression timing for the next musical tone, and calculates the tempo of the user's musical performance in accordance with the user's key-depression timing to make the tempo at which automatic performance data is reproduced follow the calculated tempo. Therefore, the user of the electronic musical instrument having this feature feels enjoyment in that the user can freely control the musical performance of the song.

DESCRIPTION OF THE PREFERRED EMBODIMENT

Figure 1:
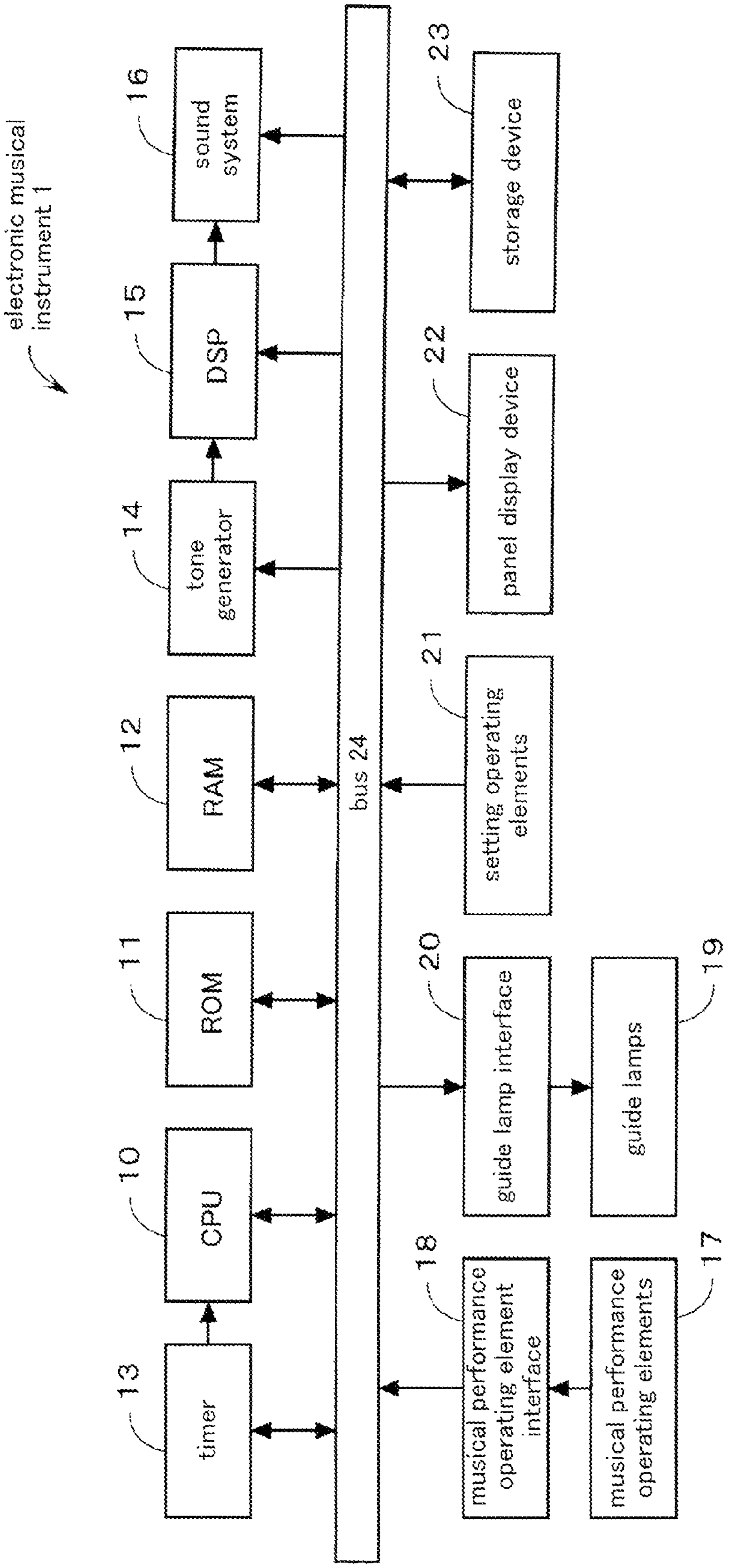
FIG. 1 is a block diagram indicative of a configuration of an electronic musical instrument according to an embodiment of the present invention.

FIG. 1 is a block diagram indicative of a configuration of an electronic musical instrument according to an embodiment of the present invention.

An electronic musical instrument 1 indicated in FIG. 1 is a keyboard instrument which provides a guide for a user to help the user play musical performance on the electronic musical instrument 1. The electronic musical instrument 1 has a keyboard which is not shown but serves as musical performance operating elements 17 formed of a horizontally arranged plurality of white keys and black keys which correspond to pitch names, respectively, and range over a plurality of octaves. Near each of the white keys and black keys, or inside each key, furthermore, a guide lamp 19 is provided in order to indicate, as a musical performance guide, that a corresponding key should be played. Above the performance operating elements 17 and the guide lamps 19, an operating panel is provided. On the operating panel, a panel display device 22 formed of a liquid crystal display is provided. On the both sides of the panel display device 22, furthermore, speakers of a sound system 16 are arranged. Between the panel display device 22 and the speakers, setting operating elements 21 are arranged. By manipulating the setting operating elements 21, the user specifies the tone color and the tone volume of musical tones to be generated, and makes various settings on the electronic musical instrument 1 such as instructions to set what is to be displayed on the panel display device 22. The setting operating elements 21 include at least operating elements for setting the means for selecting a song which is to be automatically played and the mode in which the musical performance guide operates, and a switch for starting reproduction of the selected song. The musical performance guide capability provided for the electronic musical instrument 1 is the waiting-reproduction. In the waiting mode, furthermore, the electronic musical instrument 1 allows the user to switch between "tempo-follow enabled" and "tempo-follow disabled". Furthermore, the user also can disable the musical performance guide capability to select normal reproduction by which the musical performance guide capability is disabled so that the illumination of the guide lamps and the waiting reproduction will not be conducted.

In the electronic musical instrument 1 shown in FIG. 1, a CPU 10 is a central processing unit which controls behaviors of various parts of the electronic musical instrument 1. The CPU 10 is provided with a timer 13 which indicates elapsed time at operation and generates timer-interrupts at certain intervals. A ROM (read-only memory) 11 is a nonvolatile memory which stores programs such as a musical performance guide program and a musical tone generation program, and various kinds of data such as musical performance data. A RAM (random-access memory) 12 is a volatile memory which has storage areas for storing musical performance data and various kinds of data and working areas for the CPU 10. A tone generator 14 receives musical tone control data generated by execution of the musical tone generation program by the CPU 10, stores the received musical tone control data in a tone generation register, generates musical tones in accordance with the musical tone control data, and outputs the generated musical tones to a DSP (digital signal processor) 15. In accordance with effect parameters transmitted from the CPU 10, the DSP 15 adds various effects such as reverb, chorus, variation and distortion to musical tone signals generated by the tone generator 14. The musical tone signals to which the effects have been added by the DSP 15 are supplied to the sound system 16. The sound system 16 converts the musical tone signals into analog musical tone signals, amplifies the analog musical tone signals and emits the amplified musical tone signals as musical tones from the speakers. A musical performance operating element interface 18 scans the musical performance operating elements 17 formed of the white keys and the black keys to detect the musical performance operating element 17 manipulated to be depressed or released, and transmits note-on information or note-off information about the detected musical performance operating element 17 to the CPU 10 through a bus 24. A guide lamp interface 20 receives information indicative of on/off status of the guide lamp 19 of a certain musical performance operating element from the CPU 10, and turns the corresponding guide lamp 19 on/off in accordance with the information. A storage device 23 includes various storage medium such as a hard disk HD and a compact disk CD previously integrated into the electronic musical instrument 1, and a flexible disk FD to store voluminous musical performance data and programs. The storage device 23 further includes drive units for the various storage medium.

Figure 4:
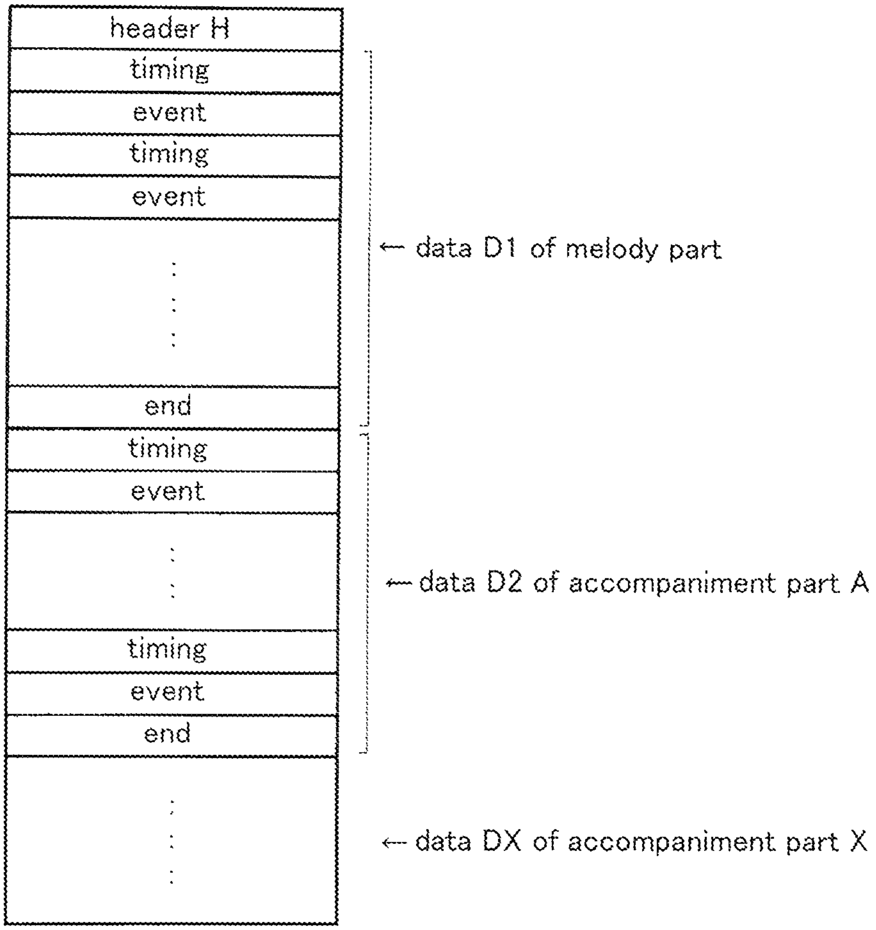
FIG. 4 is a diagram indicative of a data structure of musical performance data used by the electronic musical instrument of the present invention.

FIG. 4 indicates a data structure of musical performance data of a song stored in the ROM 11 or the storage device 23. As indicated in FIG. 4, the musical performance data is formed of a header H representative of a song name, a tempo, a key and the like, data D1 of a melody part of and data of a plurality of accompaniment parts ranging from data D2 of an accompaniment part A to data DX of an accompaniment part X. Musical performance data of each of the parts ranging from the data D1 to the data DX which represent musical instruments, respectively, is formed of a plurality of data sets which are arranged in accordance with the progression of a song, and each of which is comprised of a pair of event data and timing data corresponding to the event data. In addition to the plurality of data sets, the musical performance data of each part includes end data indicative of the end of the song. The respective timing data of the data D1 and the data D2 to data DX are specified so that the melody part and the accompaniment parts will progress concurrently when the song is played. Event data includes various data such as note-on, note number, note-off and velocity and the like. In the guided musical performance which will be described below, the melody part is the part which will be guided, while the accompaniment parts A to X are the "accompaniment part".

Next, a case in which the electronic musical instrument 1 of the present invention is in a mode of "waiting-enabled" musical performance guide with a "tempo-follow-enabled" setting will be described with reference to FIG. 2.

Figure 2:
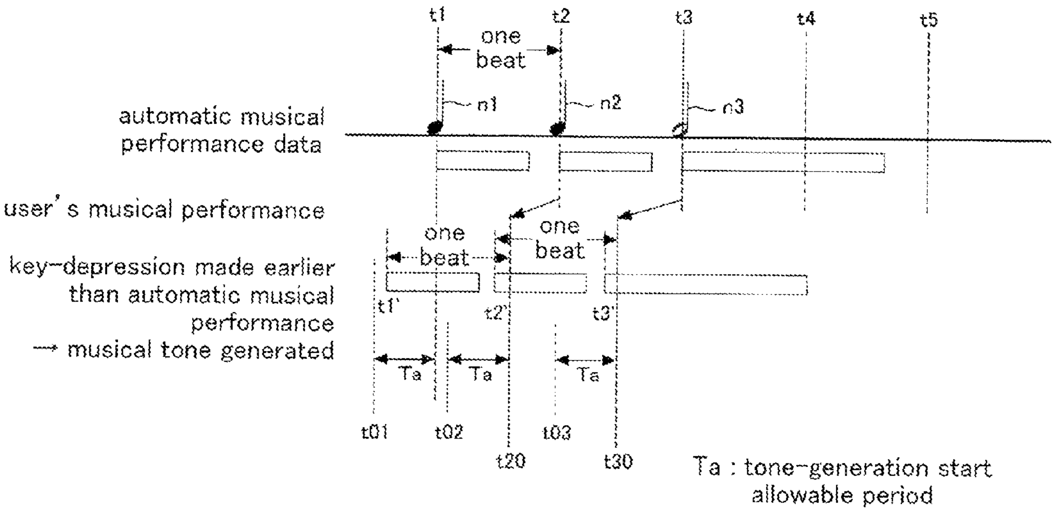
FIG. 2 is a diagram indicative of an operation of a musical performance guide of the electronic musical instrument of the present invention.

On the top row of FIG. 2, notes indicative of musical performance data of the melody part which is the guided part included in automatic performance data of a song which the user is to play are arranged in time sequence. On a row situated below the top row, note lengths of the respective notes are indicated as rectangles. On a row situated below the second row, key-depression periods each of which starts at a user's depression of a key corresponding to a note and ends at a user's release of the key are indicated as rectangles. In FIG. 2, however, note numbers of the respective notes are not shown. In FIG. 2, times t1, t2, t3, t4, t5 . . . are the times at which respective beats start. More specifically, each interval between the times is equivalent to a beat. The timing at which the first quarter note n1 of the musical performance data of the melody part is expected to be generated is time t1. The timing at which the second quarter note n2 is expected to be generated is time t2. The timing at which the third half-note n3 is expected to be generated is time t3. Respective tone lengths during which the quarter note n1 to half-note n3 are being emitted are the lengths equivalent to the respective note lengths.

In the case where the musical performance guide is in the "waiting-enabled" mode with the "tempo-follow-enabled" setting, tone-generation start allowable periods Ta which are several-fold longer than tone-generation start allowable periods Ta' that would be provided in a "tempo-follow-disabled" setting are provided so that the tone-generation start allowable periods Ta can precede respective tone-generation timings of the respective notes as indicated in FIG. 2. The tone-generation start allowable period Ta, which is provided in order to conduct the musical performance guide, is equivalent to the note length of a quarter note, for example. When the user instructs to start reproducing a selected song, the data D1 of the melody part is read out in sequence from the top in accordance with the progression of the song. In this case, more specifically, the timing data and event data of the quarter note n1 which is the top melody note is read out to turn on the guide lamp 19 indicative of a key corresponding to the tone pitch of the quarter note n1 at time t01 that is earlier by the tone-generation start allowable period Ta than the time t1 which is set as the tone-generation timing on the basis of the absolute time indicated by the timer 13 and the timing data. Assume that the user depresses the key indicated by the guide lamp 19 at time t1' which is earlier than the tone-generation timing t1. By the depression of the key, the guide lamp 19 is turned off, while the tone generator 14 starts generating the melody tone of the tone pitch at the time t1' in accordance with the event data of the quarter note n1 to keep generating the melody tone until the release of the key, with the timing data and event data representative of the quarter note n2 of the next melody tone being read out to prepare for the musical performance guide for the quarter note n2. Concurrently with the melody tone of the quarter note n1, the accompaniment part corresponding to this melody tone (more specifically, event data included in the accompaniment parts A to X and situated from the timing at which this melody tone starts being played until the timing at which the next melody tone starts being played) is read out in sequence to generate accompaniment tones in accordance with the read data by the tone generator 14.

Thus, time t20 which is later by a beat than the time t1' of the key-depression of the quarter note n1 is defined as the timing at which the quarter note n2 is expected to be generated. At time t02 which is earlier by the tone-generation start allowable period Ta than the time t20, therefore, the guide lamp 19 indicative of a key corresponding to the tone pitch of the quarter note n2 is turned on to conduct the musical performance guide for the quarter note n2. Assume that the user depresses the key indicated by the guide lamp 19 at time t2' which is earlier than the tone-generation timing t20. By the depression of the key, similarly to the above-described case, the guide lamp 19 is turned off, while the tone generator 14 starts generating a melody tone of the tone pitch specified by the event data of the quarter note n2 at the time t2' to keep generating the melody tone until the release of the key. Concurrently, the timing data and event data of the half-note n3 which is the next melody tone is read out to prepare for the musical performance guide for the half-note n3. In accordance with the progression of the automatic performance data, as described above, the guide lamps 19 indicative of keys corresponding to tone pitches of respective notes are turned on at times which are earlier by the tone-generation start allowable period Ta than respective tone-generation timings in accordance with timing data of the respective notes to conduct the musical performance guide for the respective notes.

Assume that the user depresses a key corresponding to the half-note n3 indicated by the guide lamp 19 in accordance with the musical performance guide for the half-note n3 at time t3' which is earlier than tone-generation timing t30. By the depression of the key, similarly to the above-described case, the guide lamp 19 is turned off, while the tone generator 14 starts generating a melody tone of the tone pitch specified by the event data of the half-note n3 at the time t3' to keep generating the melody tone until the release of the key. Concurrently, the timing data and event data of the next melody tone is read out to prepare for the musical performance guide for the next melody tone. Concurrently with the generation of the melody tone, data of the accompaniment part corresponding to the melody tone is read out to generate accompaniment tones in accordance with the read data by the tone generator 14.

In accordance with the progression of the automatic performance data, the data D1 of the melody part is then read out in sequence to conduct the similar procedures described above to complete the guided musical performance of the song when the end data is read out. Because the electronic musical instrument 1 is set at the "tempo-follow-enabled" setting, the tempo of the automatic performance will be controlled to follow the speed at which the user plays the song on the keyboard. In the case of FIG. 2, however, the user's speed is about the same as the tempo of the automatic performance. In the case of FIG. 2, therefore, the tempo of the automatic performance is seldom changed.

Next, details of the tempo-follow of a case in which the electronic musical instrument 1 of the present invention is in the mode of "waiting-enabled" musical performance guide with the "tempo-follow-enabled" setting will be described with reference to FIG. 3.

Figure 3:
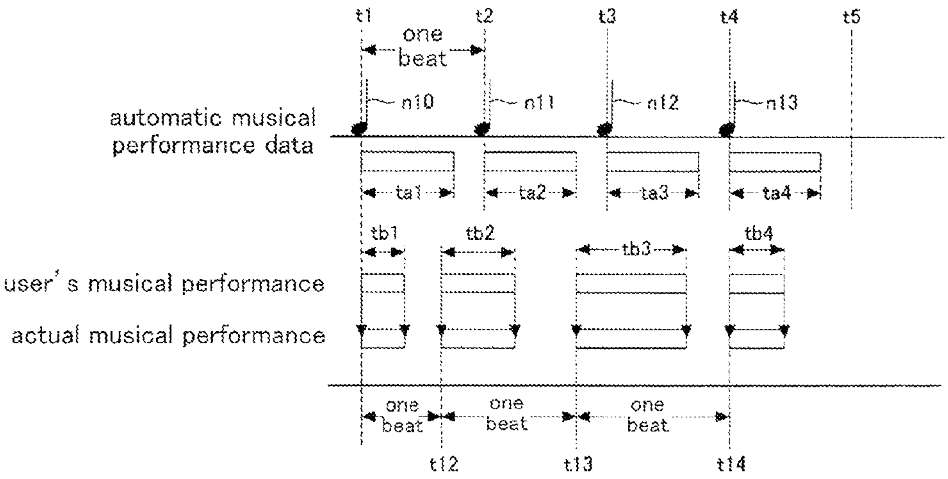
FIG. 3 is a diagram indicative of the other operation of the musical performance guide of the electronic musical instrument of the present invention.

In the case of FIG. 3, the user has selected a different song as a song that the user is to play. On the top row of FIG. 3, notes indicative of musical performance data of the melody part which is the guided part included in automatic performance data of the song are arranged in time sequence. On a row situated below the top row, note lengths of the respective notes are indicated as long rectangles. On a row situated below the second row, key-depression periods each of which starts at a user's depression of a key corresponding to a note and ends at a user's release of the key are indicated as long rectangles. In FIG. 3, however, note numbers of the respective notes are not shown. In FIG. 3, times t1, t2, t3, t4, . . . are the times at which respective beats start. More specifically, each interval between the times is equivalent to a beat. The timing at which the first quarter note n10 of the automatic performance data is expected to be generated is time t1. The timing at which the second quarter note n11 is expected to be generated is time t2. The timing at which the third quarter note n12 is expected to be generated is time t3. The timing at which the fourth quarter note n13 is expected to be generated is time t4. The note length of the quarter note n10 is ta1. The note length of the quarter note n11 is ta2. The note length of the quarter note n12 is ta3. The note length of the quarter note n13 is ta4. Because each of the notes n10 to n13 is a quarter note, the note lengths ta1 to ta4 have the same length.

As described in the explanation of FIG. 2, in the case where the musical performance guide is in the "waiting-enabled" mode with the "tempo-follow enabled" setting, the tone-generation start allowable periods Ta are provided to precede respective tone-generation timings of the notes. However, the tone-generation start allowable periods Ta are not shown in FIG. 3. When the user instructs to start reproducing the selected song, the data D1 of the melody part is read out in sequence from the top in accordance with the progression of the song. In this case, more specifically, the timing data and event data of the quarter note n10 which is the top melody note is read out to illuminate the guide lamp 19 indicative of a key corresponding to the tone pitch of the quarter note n10 at time which is earlier by the tone-generation start allowable period Ta than the time t1 which is set as the tone-generation timing on the basis of the absolute time indicated by the timer 13 and the timing data. Assume that the user recognizes the illuminated guide lamp, so that the user depresses the key indicated by the guide lamp at time t1 to keep depressing the key for a period tb1 which is shorter than the note length ta1. Because the time t1 is preceded by the illumination of the guide lamp, the user's key-depression is judged to be correct. As a result, the guide lamp 19 is distinguished, while the tone generator 14 starts generating, at the time t1, the melody tone of the tone pitch specified by the event data of the quarter note n10 to keep generating the melody tone for the period tb1 that ends at the release of the key, with the timing data and event data representative of the quarter note n11 of the next melody tone being read out to prepare for the musical performance guide for the quarter note n11. Concurrently with the generation of the melody tone of the quarter note n10, data of the accompaniment part corresponding to this melody tone is read out to generate accompaniment tones in accordance with the read data by the tone generator 14. In this case, the period tb1 during which the tones are generated is shorter than the note length of the quarter note n10.

Assume that the guide lamp 19 indicative of a key corresponding to the tone pitch of the quarter note n11 of the next melody tone is illuminated at time which is earlier, by the tone-generation start allowable period Ta, than a point in time which is situated a beat later than the timing t1 of the user's depression of the note n10, so that the user depresses the key corresponding to the quarter note n11 indicated by the guide lamp 19 at time t12 and keeps depressing the key for a period tb2 which is shorter than the note length ta2 of the quarter note n11. By the key-depression, the guide lamp 19 is distinguished, while the tone generator 14 starts generating a melody tone of the tone pitch specified by the event data of the quarter note n11 at time t12 to keep generating the melody tone during the period tb2 at the end of which the key is released. Concurrently, data of the accompaniment part corresponding to this melody tone are read out, so that the tone generator 14 generates accompaniment tones in accordance with the read data. In this case, the period tb2 during which the tones are being generated is shorter than the note length ta2 of the quarter note n11. In order to allow the tempo-follow, furthermore, the electronic musical instrument 1 detects the time interval between the time t1 of the depression of the key corresponding to the quarter note n10 and the time t12 of the depression of the key corresponding to the quarter note n11 to calculate a tempo on the basis of the detected time interval by a manner which will be described later to read out the next musical performance data at the calculated tempo. In other words, the electronic musical instrument 1 changes the tempo at each correct key-depression in accordance with a time interval between correct key-depressions. As described above, the electronic musical instrument 1 offers the tempo-follow controlled in accordance with the speed of the user's musical performance, reading out the timing data and event data of the quarter note n12 of the next melody tone to prepare for the musical performance guide for the quarter note n12.

Assume that the user then depresses a key corresponding to the quarter note n12 indicated by the guide lamp 19 at time t13 and keeps depressing the key during a period tb3 which is longer than the note length ta3 of the quarter note n12. By the depression, the guide lamp 19 is distinguished, while the tone generator 14 starts generating a melody tone of a tone pitch specified by the event data of the quarter note n12 at time t13 to keep generating the melody tone during the period tb3 at the end of which the key is released. Concurrently, data of the accompaniment part corresponding to this melody tone are read out, so that the tone generator 14 generates accompaniment tones in accordance with the read data. In this case, the period tb3 during which the tones are being generated is longer than the note length ta3 of the quarter note n12. In order to allow the tempo-follow, furthermore, the electronic musical instrument 1 detects the time interval between the time t12 of the depression of the key corresponding to the quarter note n11 and the time t13 of the depression of the key corresponding to the quarter note n12 to calculate a tempo on the basis of the detected time interval by the manner which will be described later to read out the next musical performance data at the calculated tempo. As described above, the electronic musical instrument 1 changes the tempo at each correct key-depression in accordance with the time interval between the correct key-depressions. The electronic musical instrument 1 then reads out the timing data and event data of the quarter note n13 of the next melody tone to prepare for the musical performance guide for the quarter note n13.

Assume that the user then depresses a key corresponding to the quarter note n13 indicated by the guide lamp 19 at time t14 and keeps depressing the key during a period tb4 which is shorter than the note length ta4 of the quarter note n13. By the depression, the guide lamp 19 is distinguished, while the tone generator 14 starts generating a melody tone specified by the event data of the quarter note n13 at time t14 to keep generating the melody tone during the period tb4 at the end of which the key is released. Concurrently, data of the accompaniment part corresponding to this melody tone is read out, so that the tone generator 14 generates accompaniment tones in accordance with the read data. In this case, the period tb4 during which the tones are being generated is shorter than the note length ta4 of the quarter note n13. In order to allow the tempo-follow, furthermore, the electronic musical instrument 1 detects the time interval between the time t13 of the depression of the key corresponding to the quarter note n12 and the time t14 of the depression of the key corresponding to the quarter note n13 to calculate a tempo on the basis of the detected time interval by the manner which will be described later to read out the next musical performance data at the calculated tempo.

In the case where the electronic musical instrument 1 according to the present invention is set at the "tempo-follow-enabled" musical performance guide, as described above, the electronic musical instrument 1 changes the tempo at respective correct key-depressions in accordance with respective intervals between correct key-depressions. In other words, the electronic musical instrument 1 changes the tempo which is equivalent to one beat of automatic performance of a song in accordance with the speed at which the user plays the song.

In the case where the electronic musical instrument 1 of the present invention is in the "waiting-enabled" musical performance guide mode with the "tempo-follow enabled" setting, as described above, the electronic musical instrument 1 provides, at points which are earlier than the respective tone-generation timings of the notes representative of musical performance data of the song which the user is to play as indicated in FIG. 2, the tone-generation start allowable periods Ta which are several-fold longer than the tone-generation start allowable periods Ta' that would be provided for a tempo-follow disabled setting. As indicated in FIG. 3, furthermore, the electronic musical instrument 1 changes the length of one beat which is equivalent to the tempo of automatic musical performance of the song in accordance with the speed at which the user plays the song. Therefore, the electronic musical instrument 1 of the present invention satisfies user demand not only to simply play as indicated by musical performance guide but also to play fast and lightly and to play slowly and sentimentally. In this case, even when the user plays lightly and fast, the electronic musical instrument 1 allows generation of user's played notes without judging user's key-depressions to be wrong. Therefore, the electronic musical instrument 1 not only allows user's musical performance to be sound natural but also provides the user with the sense of satisfaction that the user controls the musical performance of a song as the user desires.

The musical performance guide offered by the electronic musical instrument of the present invention is designed such that if a key indicated by the guide lamp 19 has not been depressed even at the tone-generation timing, the electronic musical instrument 1 enters the above-described waiting state to suspend the reading of the next musical performance data to wait until the user depresses the key indicated by the guide lamp 19.

In a case where the electronic musical instrument 1 is in the "waiting-enabled" musical performance guide mode without "tempo-follow", the tone-generation start allowable periods Ta' are provided before respective tone-generation timings of notes representative of musical performance data of a song which the user is to play. The length of the tone-generation start allowable period Ta' of the case in which "tempo-follow" is disabled is sufficiently short, such as the note length of a thirty-second note. In this setting, furthermore, the electronic musical instrument 1 will not change the tempo which determines the length of one beat of automatic performance of the song in accordance with the speed at which the user plays the song. This is because the setting in which "tempo-follow" is disabled is used primarily when the user desires to learn accurate key-depression timing.

Figure 5A:
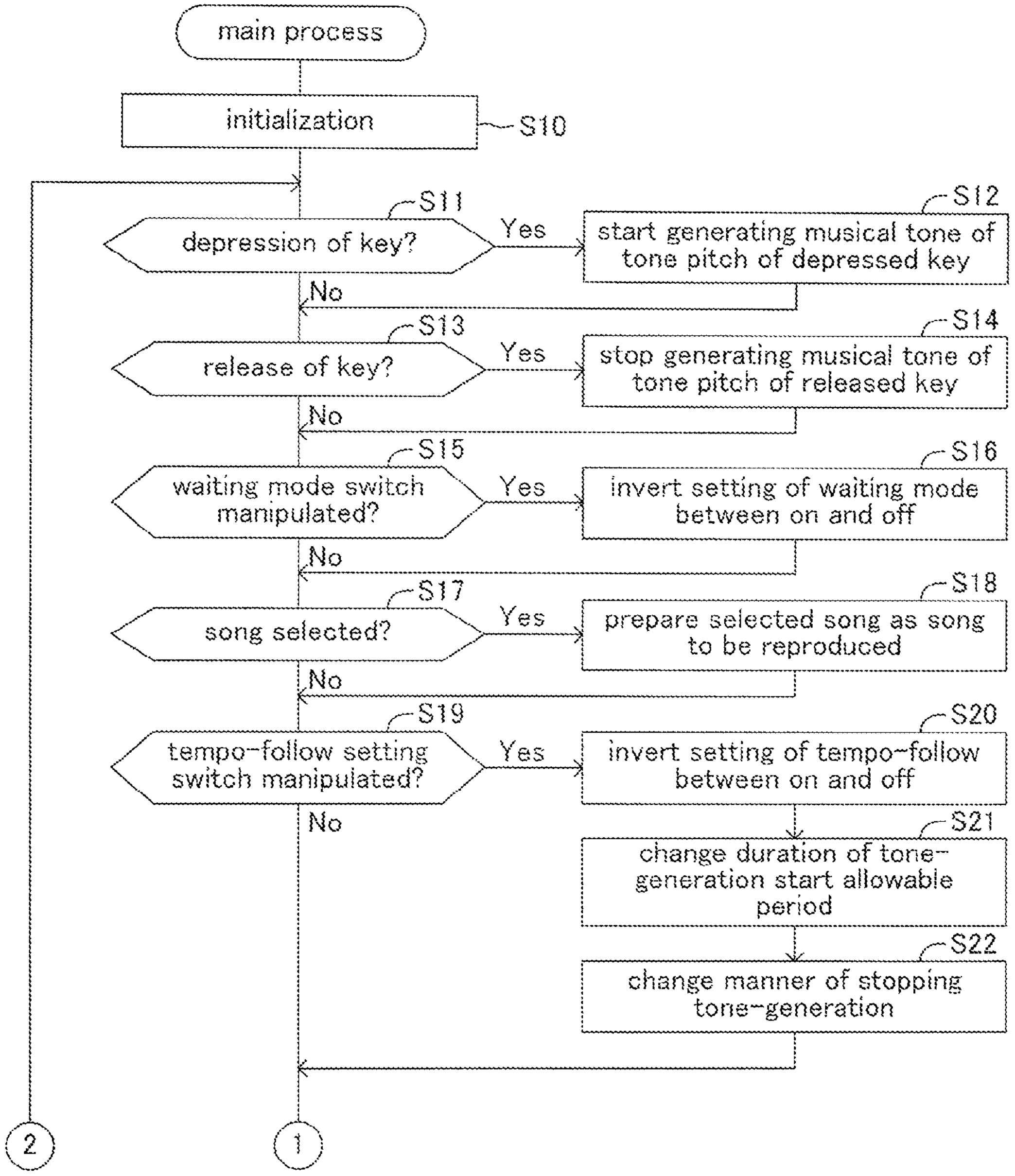
FIG. 5A is a flowchart indicative of a part of a main process executed by the electronic musical instrument of the present invention.
Figure 5B:
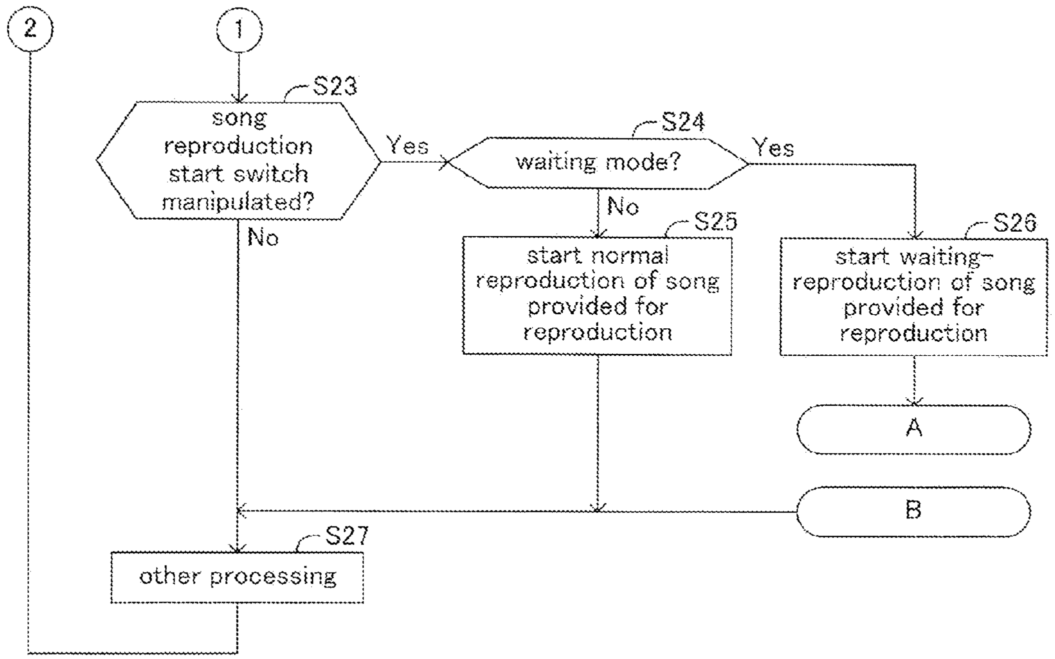
FIG. 5B is a flowchart indicative of the other part of the main process executed by the electronic musical instrument of the present invention.
Figure 6A:
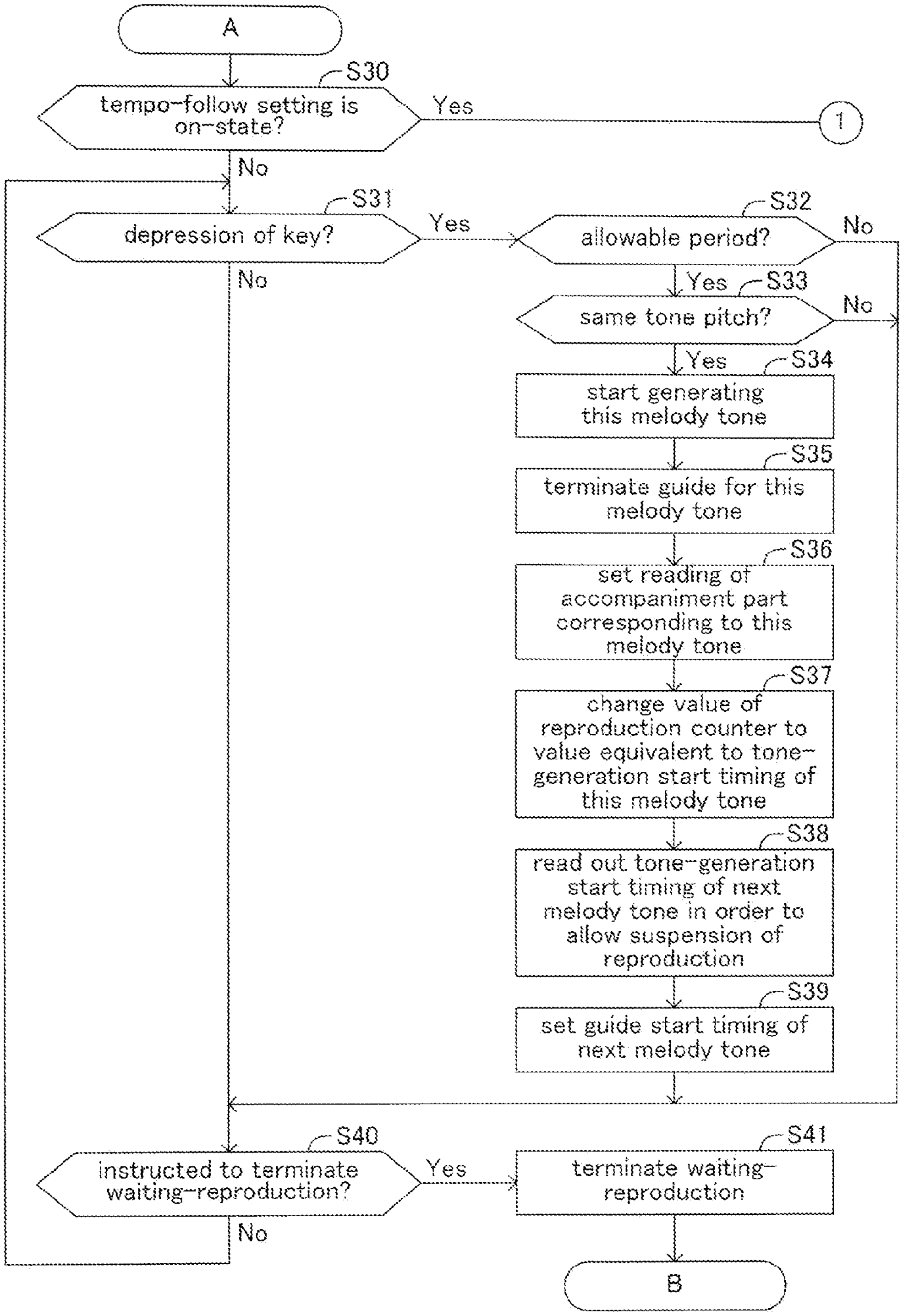
FIG. 6A is a flowchart indicative of a part of a process done during waiting-reproduction, the process being performed in the main process executed by the electronic musical instrument of the present invention.
Figure 6B:
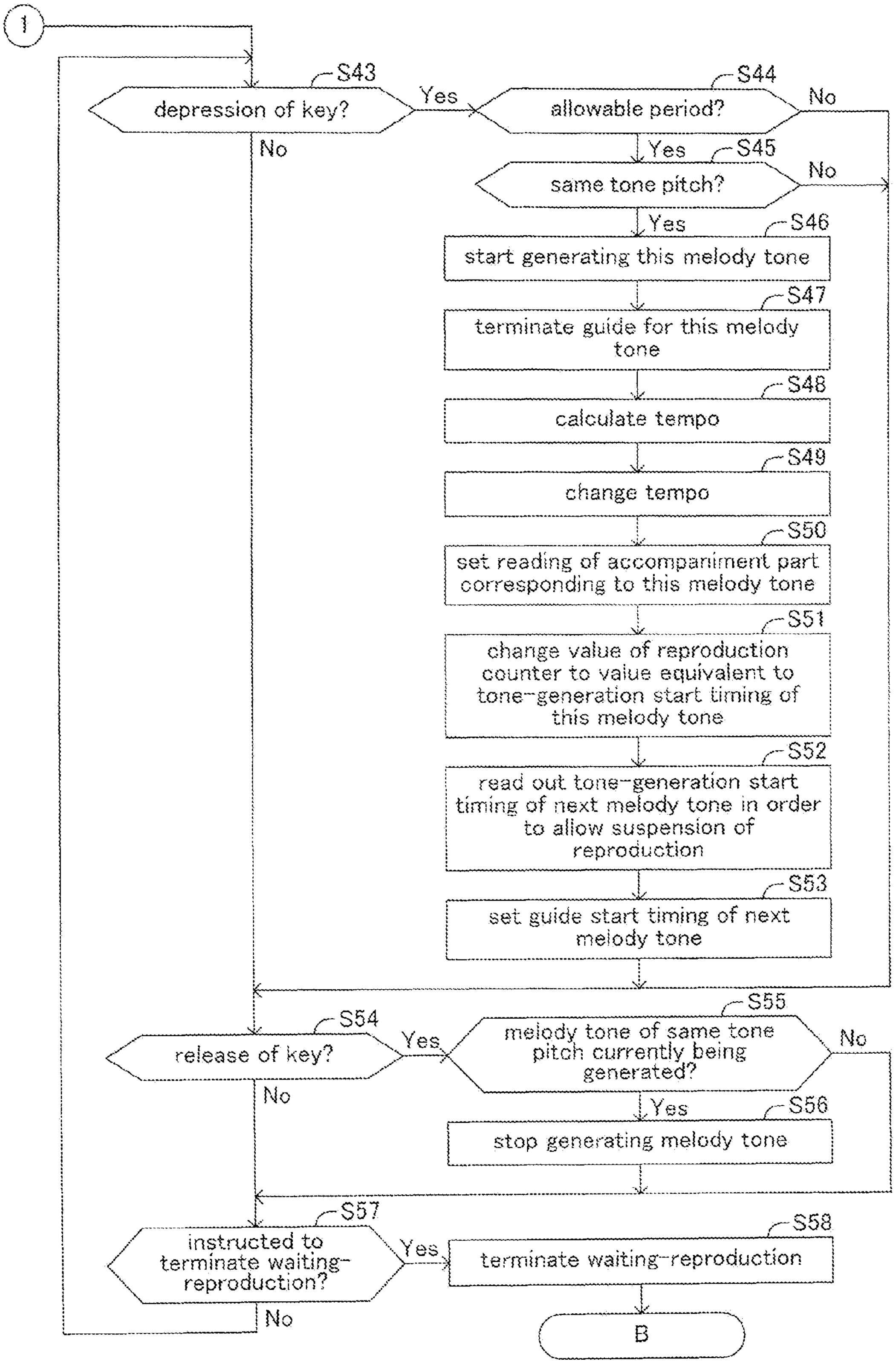
FIG. 6B is a flowchart indicative of the other part of the process done during waiting-reproduction, the process being performed in the main process executed by the electronic musical instrument of the present invention.
Figure 7A:
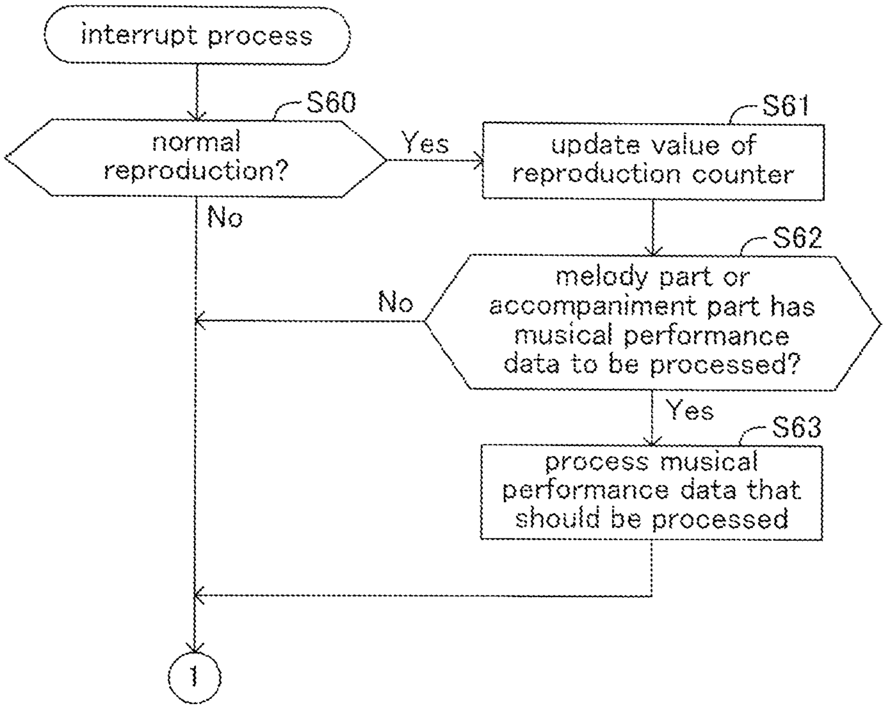
FIG. 7A is a flowchart indicative of a part of an interrupt process executed by the electronic musical instrument of the present invention.
Figure 7B:
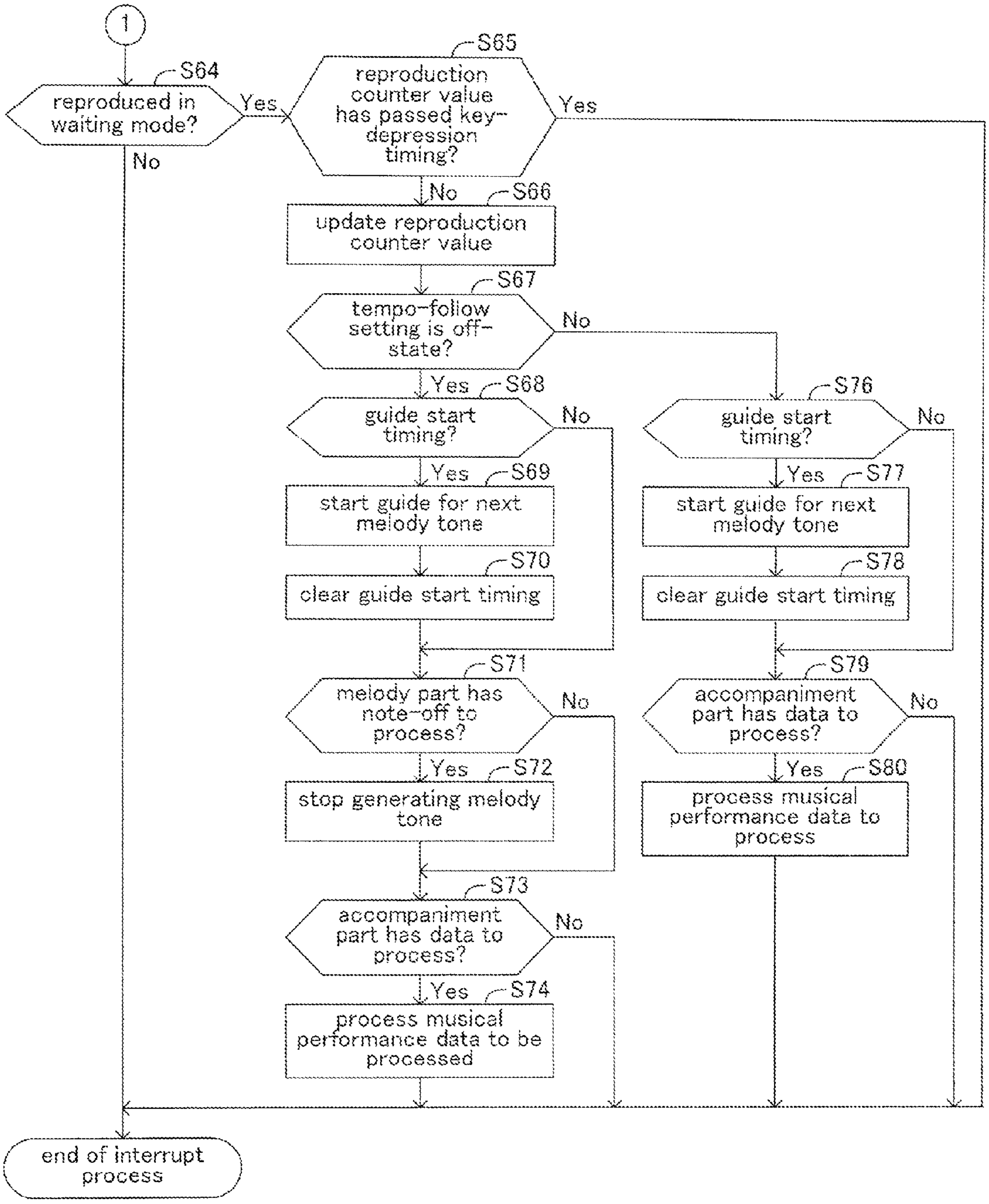
FIG. 7B is a flowchart indicative of the other part of the interrupt process executed by the electronic musical instrument of the present invention.
Figure 8:
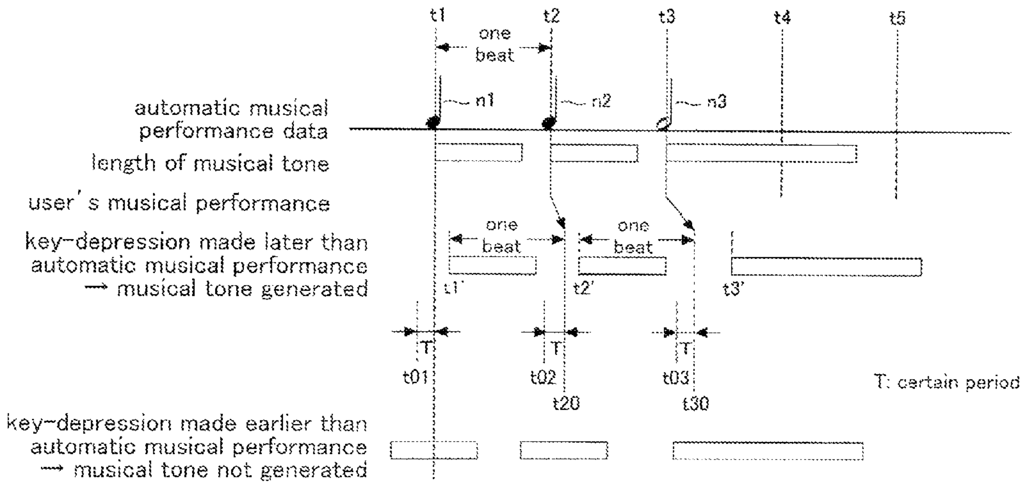
FIG. 8 is a diagram indicative of an operation of a musical performance guide of a conventional electronic musical instrument.
Figure 9:
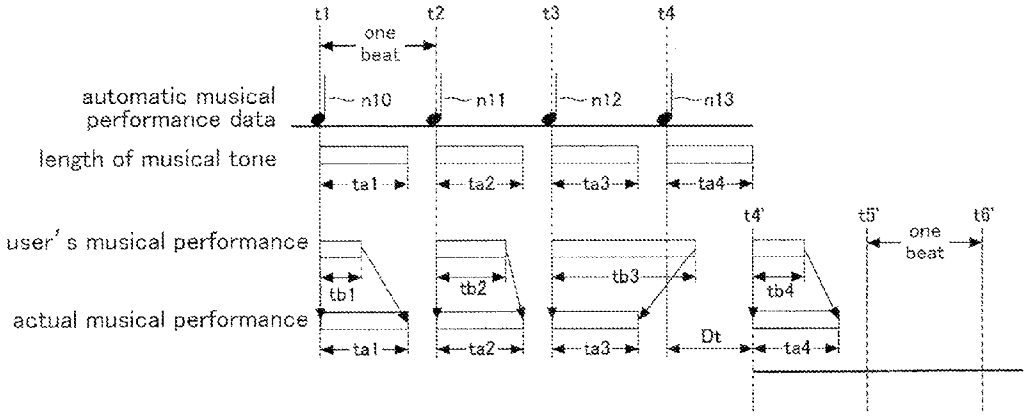
FIG. 9 is a diagram indicative of the other operation of a musical performance guide of a conventional electronic musical instrument.

FIGS. 5A and 5B are flowcharts of a main process executed by the CPU 10 of the electronic musical instrument 1 of the present invention. FIGS. 6A and 6B are flowcharts of a process executed during waiting-reproduction performed in the main process, while FIGS. 7A and 7B are flowcharts of an interrupt process executed by the CPU 10.

With reference to the flowcharts indicated in FIGS. 5A to 7B, the operation of the electronic musical instrument 1 of the present invention will be described.

At power-on of the electronic musical instrument 1 of the present invention, the CPU 10 starts the main process shown in FIGS. 5A and 5B to initialize the electronic musical instrument 1 in step S10. This initialization includes setting of the initial tone color for the tone generator 14 and clearing of various registers in the RAM 12. In addition, the musical performance guide is reset to an initial state. The initial state is the "waiting-enabled" musical performance guide without "tempo-follow", for example. However, the user can set the initial state of the musical performance guide as desired by bringing up a setting screen on the panel display device 22 to select a user's desired state by manipulating the setting operating elements 21.

As for steps S11 to S27 of the main process, when any of the musical performance operating elements 17, the setting operating elements 21 or the like is manipulated in regard to musical performance on the electronic musical instrument 1, a process corresponding to the manipulation is executed. Furthermore, steps S11 to S27 are repeatedly executed while the power of the electronic musical instrument 1 is in the on-state. When any of the musical performance operating elements 17 is depressed, the musical performance operating element interface 18 scans the musical performance operating elements 17 to detect an event of the depression. The CPU 10 then determines in step S11 that a key has been depressed, and branches to step S12. In step S12, the CPU 10 carries out a process for starting generating a musical tone of a tone pitch corresponding to the depressed key. When any of the musical performance operating elements 17 is released, the musical performance operating element interface 18 scans the musical performance operating elements 17 to detect an event of the release. The CPU 10 then determines in step S13 that a key has been released, and branches to step S14. In step S14, the CPU 10 carries out a process for stopping generating a musical tone of a tone pitch corresponding to the released key.

When a waiting mode switch included in the setting operating elements 21 is manipulated, the CPU 10 determines in step S15 that the waiting mode switch has been manipulated, and proceeds to step S16. In step S16, the CPU 10 inverts the current state between on and off to rewrite the value of a waiting mode flag. In a case where the waiting mode has been in on-state before the manipulation, the CPU 10 toggles the waiting mode flag to off. In a case where the waiting mode has been in off-state before the manipulation, the CPU 10 toggles the waiting mode flag to on. When the setting operating elements 21 are manipulated to select a song, the CPU 10 determines in step S17 that the manipulation of selecting a song has been done, and proceeds to step S18. In step S18, the selected song is prepared as a song to be reproduced, so that data on the song is stored in a reproduction-use song register provided in the RAM 12. Even if the user attempts to select a song during reproduction of a song, the user's manipulation of selecting a song is rejected, because the electronic musical instrument 1 is designed such that any manipulation of selecting a song will not be accepted during reproduction of a song.

When a tempo-follow setting switch included in the setting operating elements 21 is manipulated, the CPU 10 determines in step S19 that the tempo-follow setting switch has been manipulated, and proceeds to step S20. In step S20, the CPU 10 inverts the current state of the tempo-follow setting between on and off to rewrite the value of a tempo-follow setting flag. In a case where the tempo-follow setting flag is in on-state before the manipulation of the tempo-follow setting switch, the CPU 10 turns the tempo-follow setting flag to off. In a case where the tempo-follow setting flag is in off-state before the manipulation of the tempo-follow setting switch, the CPU 10 turns the tempo-follow setting flag to on. After the step S20, the CPU 10 proceeds to step S21 to change the duration of the tone-generation start allowable periods Ta. The CPU 10 then switches the manner of stopping tone-generation in step S22. In the step S21 and step S22, in a case where the tempo-follow setting flag has been inverted to on-state in step S20 to have the setting of "tempo-follow enabled", the CPU 10 changes, in step S21, the tone-generation start allowable period for waiting-reproduction to a later-described predetermined tone-generation start allowable period (allowable time #2) provided for tempo-follow enabled setting. The allowable time #2 is the long tone-generation start allowable period Ta which is equivalent to the note length of a quarter note, for example. In step S22, furthermore, the CPU 10 changes the timing at which tone-generation stops not to the note-off timing of corresponding musical performance data but to the timing of key-release. In a case where the tempo-follow setting flag has been inverted to off-state in step S20 to have the setting of "tempo-follow disabled", the CPU 10 changes, in step S21, the tone-generation start allowable period to a predetermined tone-generation start allowable period (allowable time #1) provided for tempo-follow disabled setting. The allowable time #1, which is shorter than the allowable time #2, is the short tone-generation start allowable period Ta' which is equivalent to the note length of a thirty-second note, for example. In step S22, furthermore, the CPU 10 changes the timing at which tone-generation stops not to the key-release timing but to the note-off timing of musical performance data corresponding to the released key.

When the manipulation of starting reproduction of a song is made, the CPU 10 determines in step S23 that the manipulation of starting reproduction of a song has been made, and proceeds to step S24. In step S24, the CPU 10 determines whether the electronic musical instrument 1 is currently in the waiting mode or not. In a case where the current state of the waiting mode flag is on-state to be the "waiting-enabled" mode, the CPU 10 proceeds to step S26. In a case where the current state of the waiting mode flag is off-state to be the "waiting-disabled" mode, the CPU 10 proceeds to step S25. In step S25, the CPU 10 starts the processing for starting normal reproduction of a song prepared for reproduction. By the processing for starting normal reproduction, the CPU 10 resets a counter which is provided for reproduction of a song and is stored in the register for reproduction of a song, starts the interrupt process indicated in FIGS. 7A and 7B, and sets a reproduction flag so that it will be determined in the interrupt process that the song is being normally reproduced. Furthermore, the song provided for reproduction is set as a target song to be processed in the interrupt process, with a tempo recorded in the song being set as the tempo for use in reproduction. The electronic musical instrument 1 is designed such that even if the manipulation of starting reproduction of a song is done during reproduction of a song, such a manipulation is ignored in step S23 to disable the manipulation of starting reproduction of a song. The counter for use in reproduction of a song counts at a speed corresponding to a set tempo, while the automatic performance of musical performance data progresses in accordance with the counted value of the reproduction counter. Therefore, the speed at which the automatic musical performance progresses varies in accordance with the set tempo.

In step S26, the CPU 10 starts the processing for starting waiting-reproduction of a song provided for reproduction. In the processing for starting reproduction in the waiting mode, the CPU 10 resets the reproduction counter, starts the interrupt process indicated in FIGS. 7A and 7B, and sets the reproduction flag so that it will be determined in the interrupt process that the song is currently being reproduced in the waiting mode. Furthermore, the song provided for reproduction is set as a target song to be processed in the interrupt process, with a tempo recorded in the song being set as the tempo for use in reproduction to specify the guide start timing of the first musical performance data (note-on) of the melody part. More specifically, the CPU 10 specifies the guide start timing in accordance with the tone-generation start allowable period (#1: allowable time Ta' or #2: allowable time Ta) set in accordance with the current setting of the tempo-follow setting flag (on/off). After the step S26, the CPU 10 carries out a process indicated in FIGS. 6A and 6B which is conducted during the waiting-reproduction of a song. The CPU 10 keeps carrying out the process done during the waiting-reproduction without returning to the main process of FIGS. 5A and 5B until the CPU 10 is instructed to terminate the waiting-reproduction. When the CPU 10 is instructed to terminate the waiting-reproduction, the CPU 10 returns to the main process of FIGS. 5A and 5B to proceed to step S27. In step S27, the CPU 10 conducts panel processing such as display processing on the panel display device 22 and other processing.

As described above, the main process formed of the steps S11 to S27 is repeatedly carried out as long as the power of the electronic musical instrument 1 is in on-state, so that a manipulation done by the user on the electronic musical instrument 1 will cause the CPU 10 to carry out processing corresponding to the manipulation.

The process done during the waiting-reproduction shown in FIGS. 6A and 6B is executed, as indicated in the main process shown in FIGS. 5A and 5B, in the case where the waiting mode is in on-state, when the song reproduction start switch is manipulated to start the reproduction of a song selected for reproduction.

In this process which is executed during the waiting-reproduction, it is determined in step S30 whether the tempo-follow setting flag is in on-state or not. In a case where it is determined that the tempo-follow setting flag is in off-state, that is, in a case of the tempo-follow disabled setting, a waiting-reproduction process formed of steps S31 to S40 is repeatedly executed. In a case where it is determined that the tempo-follow setting flag is in on-state, that is, in a case of the tempo-follow enabled setting, a waiting-reproduction process formed of steps S43 to S57 is repeatedly executed.

In the case where the tempo-follow setting flag is in off-state, when the user depresses the musical performance operating element 17, the musical performance operating element interface 18 detects an event of the key-depression. By the detection, it is determined in step S31 that there has been a key-depression, so that the CPU 10 proceeds to step S32. In step S32, it is determined whether it is currently in the tone-generation start allowable period or not. Being in the tone-generation start allowable period indicates that the guide is currently being provided, that is, that the guide lamp has illuminated at the timing which is earlier by the tone-generation start allowable period Ta' (allowable time #1) than the correct timing at which the currently processed melody tone is expected to be played, and is still illuminating. If the guide is currently being provided, it is determined that it is currently in the tone-generation start allowable period to proceed to step S33. If the guide is not currently being provided, it is determined that it is not currently in the tone-generation start allowable period to skip steps S33 to S39. This is because a key-depression made while the guide is not being provided is regarded as a wrong key-depression. Therefore, such a key-depression will not be processed.

In step S33, it is determined whether the tone pitch of the key depressed by the user matches with the tone pitch of this melody tone indicated by the musical performance guide. In a case where the user has depressed the key having the tone pitch indicated by the musical performance guide, the key-depression is judged to be a correct key-depression to proceed to step S34 to start generation of this melody tone. In a case where the user has depressed a key which is different from the key indicated by the musical performance guide, the key-depression is judged to be a wrong key-depression to skip the steps S34 to S39 without executing the processing for generating a tone corresponding to the key-depression. In the tone-generation start process of the step S34, the CPU 10 transmits musical tone control data of this melody tone to the tone generator 14, so that the tone generator 14 starts generating this melody tone in accordance with the musical tone control data. After the step S34, because of the correct key-depression, the guide lamp for the key corresponding to this melody tone is distinguished in step S35 to terminate the guide for this melody tone.

In step S36, the CPU 10 sets the reading of the accompaniment part corresponding to this melody tone, while the CPU 10 displaces the top of the accompaniment part corresponding to this melody tone to the tone-generation start timing of this melody tone. The CPU 10 then proceeds to step S37 to change the value of the reproduction counter to a value equivalent to the tone-generation start timing of this melody tone. In the step S37, more specifically, the CPU 10 changes the value of the reproduction counter which will be used in the interrupt process indicated in FIGS. 7A and 7B to a value which is one clock earlier than the tone generation start timing of this melody tone so that the accompaniment part will be successfully reproduced at the timing to which the accompaniment part has been displaced in the step S36. After the step S37, the CPU 10 proceeds to step S38 to read out the tone-generation start timing of the next melody tone in order to allow suspension of the reproduction. More specifically, the step S38 is a step for replacing the timing at which the progression of the automatic musical performance data is temporarily suspended with a new value, that is, with the tone-generation start timing of the next melody tone. This step is necessary in order to temporarily suspend the accompaniment for the current melody tone at the tone-generation timing of the next melody tone if the next melody tone has not been played. In step S39, the CPU 10 sets the timing which is earlier by the tone-generation start allowable period Ta' than the tone-generation start timing of the next melody tone as the timing at which the guide starts. The tone-generation start allowable period Ta' used in the step S39 is the short allowable time #1, for the tempo-follow setting flag is in the off-state.

When the CPU 10 detects the user's manipulation of a waiting-reproduction stop switch in the state in which the tempo-follow setting flag is in off-state, or when the CPU 10 detects that the reproduction of the reproduced song has progressed to the end of the song to reach the end position, the CPU 10 determines in step S40 that the electronic musical instrument 1 is instructed to terminate the waiting-reproduction. The CPU 10 then proceeds to step S41 to terminate the waiting-reproduction. After the processing of terminating the waiting-reproduction, the CPU 10 returns to the step S27 of the main process.

Even if the musical performance operating element 17 is released in the setting at which the tempo-follow setting, flag is in off-state, the electronic musical instrument 1 will not stop generation of the melody tone corresponding to the released key. In a case where the tempo-follow setting flag is in off-state, more specifically, the electronic musical instrument 1 stops generation of the currently generated melody tone not at the time of the release of a key by which the start of the generation of the melody tone has been instructed but when the automatic performance has progressed to read out note-off data of the melody tone included in the reproduced song.

In the case where the tempo-follow setting flag is in on-state, when the user depresses the musical performance operating element 17, the musical performance operating element interface 18 detects an event of the key-depression. By the detection, it is determined in step S43 that there has been a key-depression, so that the CPU 10 proceeds to step S44. In step S44, it is determined whether it is currently in the tone-generation start allowable period or not. Being in the tone-generation start allowable period indicates that the guide is currently being provided, that is, that the guide lamp has illuminated at the timing which is earlier by the tone-generation start allowable period Ta (allowable time #2) than the correct timing at which this melody tone is expected to be played, and is still illuminating. If the guide is currently being provided, it is determined that it is currently in the tone-generation start allowable period to proceed to step S45. If the guide is not currently being provided, it is determined that it is not currently in the tone-generation start allowable period to skip steps S45 to S53. This is because a key-depression made while the guide is not being provided is regarded as a wrong key-depression. Therefore, such a key-depression will not be processed.

In step S45, it is determined whether the tone pitch of the key depressed by the user matches with the tone pitch of this melody tone indicated by the musical performance guide. In a case where the user has depressed the key having the tone pitch indicated by the musical performance guide, the key-depression is judged to be a correct key-depression to proceed to step S46 to start generation of this melody tone. In a case where the user has depressed a key which is different from the key indicated by the musical performance guide, the key-depression is judged to be a wrong key-depression to skip the steps S46 to S53 without executing the processing for generating a tone corresponding to the key-depression. In the tone-generation start process of the step S46, the CPU 10 transmits musical tone control data of this melody tone to the tone generator 14, so that the tone generator 14 starts generating this melody tone in accordance with the musical tone control data. After the step S46, because of the correct key-depression, the guide lamp, for the key corresponding to this melody tone is distinguished in step S47 to terminate the guide for this melody tone.

In step S48, a tempo is calculated. As an example of the tempo calculation, the time interval between correct key-depressions is detected to divide the detected time by a note length of corresponding musical performance data to obtain the time length per beat. Such a calculation is done for each of the preceding two notes to obtain respective time lengths per beat to obtain the mean value of the time lengths as a tempo which is to be used for reading the next musical performance data. In step S49, the current tempo is changed to the thus obtained tempo. In step S50, the CPU 10 sets the reading of the accompaniment part corresponding to this melody tone, while the CPU 10 displaces the top of the accompaniment part corresponding to this melody tone to the tone-generation start timing of this melody tone. The CPU 10 then proceeds to step S51 to change the value of the reproduction counter to a value equivalent to the tone-generation start timing of this melody tone. In the step S51, more specifically, the CPU 10 changes the value of the reproduction counter which will be used in the interrupt process indicated in FIGS. 7A and 7B to a value which is one clock earlier than the tone generation start timing of this melody tone so that the accompaniment part will be successfully reproduced at the timing to which the accompaniment part has been displaced in step S50. After the step S51, the CPU 10 proceeds to step S52 to read out the tone-generation start timing of the next melody tone in order to allow suspension of the reproduction. More specifically, the step S52 is a step for replacing the timing at which the progression of the automatic musical performance data is temporarily suspended with a new value, that is, with the tone-generation start timing of the next melody tone. This step is necessary in order to temporarily suspend the accompaniment corresponding to the current melody tone at the tone-generation timing of the next melody tone in a case where the next melody tone has not been played. The CPU 10 then proceeds to step S53 to set the guide start timing of the next melody tone. In step S53, the CPU 10 sets the timing which is earlier by the currently set tone-generation start allowable period Ta than the tone-generation start timing of the next melody tone as the timing at which the guide starts. The tone-generation start allowable period Ta used in the step S53 is the long allowable time #2, since the tempo-follow setting flag is in the on-state.

In the case where the tempo-follow setting flag is in on-state, when the user releases the musical performance operating element 17, the musical performance operating element interface 18 detects an event of the key-release. By the detection, it is determined in step S54 that there has been a key-release, so that the CPU 10 proceeds to step S55. In step S55, it is determined whether a melody tone having the same tone pitch as the user's released key is being generated. In a case where a melody tone having the same tone pitch as the released key is being generated, the tone-generation of the melody tone is stopped in step S56.

When the CPU 10 detects the user's manipulation of the waiting-reproduction stop switch in the state in which the tempo-follow setting flag is in on-state, or when the CPU 10 detects that the reproduction of the reproduced song has progressed to the end of the song to reach the end position, the CPU 10 determines in step S57 that the electronic musical instrument 1 is instructed to terminate the waiting-reproduction. The CPU 10 then proceeds to step S58 to terminate the waiting-reproduction. After the processing of terminating the waiting-reproduction, the CPU 10 returns to the step S27 of the main process.

Next, the interrupt process which is indicated in FIGS. 7A and 7B and is started at each timing clock of musical performance data will be explained. The time length relative to one timing clock varies in accordance with the tempo of a reproduced song. More specifically, when the tempo is changed by the step S49 included in the process executed during the waiting-reproduction, the time intervals between the starts of the interrupt process also vary with the changed tempo.

In a case where the reproduction flag indicates that a song is being normally reproduced when the interrupt process shown in FIGS. 7A and 7B starts, it is determined in step S60 that the song is being normally reproduced, so that the value of the reproduction counter is updated in step S61. In step S61, the value of the reproduction counter increments by 1. After the step for updating the value of the reproduction counter which counts the number of timing clocks of musical performance data, in a case where the song to be reproduced includes musical performance data which is to be processed at the timing which matches with the updated value of the reproduction counter, it is determined in step S62 that the melody part or the accompaniment part has musical performance data which should be processed. In step S63, without distinguishing between the melody part and the accompaniment part, musical performance data of all the parts which should be processed at this timing is processed. In step S63, various processing such as generating a musical tone, stopping generation of a musical tone and changing the tone volume and tone color is done in accordance with corresponding musical performance data of the melody part and the accompaniment part. Although the CPU 10 proceeds from the step S63 to step S64, the CPU 10 gives "no" in step S64 because of the normal reproduction of the song, and terminates the interrupt process.

In a case where the reproduction flag indicates that a song is being reproduced in the waiting mode when the interrupt process shown in FIGS. 7A and 7B starts, the CPU 10 gives "no" in step S60 to proceed to step S64. In step S64, it is determined that the song is being reproduced in the waiting mode. In step S65, it is determined whether the user has failed to depress a correct key to miss the correct tone-generation timing of the melody tone indicated by the musical performance guide as the key which the user is expected to depress. More specifically, if the value of the reproduction counter has reached a point which is one clock earlier than the correct tone-generation timing of the melody tone, the CPU 10 gives "yes". If the value of the reproduction counter has not reached the point yet, the CPU 10 gives "no". In a case where it is determined that the reproduction counter value has reached the point, the interrupt process terminates, so that the counted value of the reproduction counter stops at one clock earlier than the correct tone-generation timing. The reproduction counter resumes counting when the correct key is depressed. By the correct key-depression, in other words, the melody tone which the user should depress is replaced with the next melody tone, while the correct tone-generation timing with which the comparison is made is also replaced with the tone-generation start timing of the next melody tone. Therefore, it is regarded that the value of the reproduction counter has not reached the new tone-generation timing.

In a case where it is determined in step S65 that the reproduction counter value has not passed the key-depression timing yet, the CPU 10 proceeds to step S66 to increment the reproduction counter value by 1 to update the reproduction counter value. In a case where the tempo-follow setting flag is in off-state, it is determined in step S67 that the tempo-follow setting flag is in off-state to proceed to step S68. In step S68, it is determined whether the reproduction counter value has reached the timing at which the currently set guide starts. If it is determined that the counter value has reached the timing, the CPU 10 proceeds to step S69 to illuminate the guide lamp of a key whose tone pitch corresponds to the tone pitch of the next melody tone which the user is expected to depress next. The CPU 10 then proceeds to step S70 to clear the start timing of the currently set guide. If it is determined in the step S68 that the reproduction counter value has not reached the timing at which the currently set guide starts, the steps S69, S70 will be skipped. In a case where the tempo-follow setting flag is in off-state, and it is determined in step S71 that the melody part has a note-off event which should be processed at this timing, the CPU 10 stops generation of the corresponding melody tone in step S72. In a case where it is determined in step S71 that the melody part does not have any note-off events which should be processed at this timing, the step S72 will be skipped.

In a case where the tempo-follow setting flag is in off-state, and it is determined in step S73 that the accompaniment part has musical performance data indicative of a note-on event or note-off event which should be processed in this timing, the CPU 10 proceeds to step S74 to generate or stop an accompaniment tone in accordance with the corresponding musical performance data of the accompaniment part. As described above, the CPU 10 successively executes processing for automatic performance of the accompaniment part as in the case of the normal reproduction. In a case where it is determined in step S73 that the accompaniment part does not have any musical performance data indicative of a note-on event or note-off event which should be processed in this timing, the step S74 will be skipped.

In a case where the tempo-follow setting flag is in on-state, it is determined in step S67 that the tempo-follow setting flag is in on-state to proceed to step S76. In step S76, it is determined whether the reproduction counter value has reached the timing at which the currently set guide starts. If it is determined that the counter value has reached the timing, the CPU 10 proceeds to step S77 to illuminate the guide lamp of a key whose tone pitch corresponds to the tone pitch of the next melody tone which the user is expected to depress next. The CPU 10 then proceeds to step S78 to clear the start timing of the guide. If it is determined in step S76 that the reproduction counter value has not reached the timing at which the currently set guide starts yet, the steps S77, S78 will be skipped. In a case where the tempo-follow setting flag is in on-state, and it is determined in step S79 that the accompaniment part has musical performance data indicative of a note-on event or note-off event which should be processed in this timing, the CPU 10 proceeds to step S80 to generate or stop an accompaniment tone in accordance with the corresponding musical performance data of the accompaniment part. As described above, the CPU 10 successively executes processing for automatic performance of the accompaniment part as in the case of the normal reproduction. In a case where it is determined in step S79 that the accompaniment part does not have any musical performance data indicative of a note-on event or note-off event which should be processed in this timing, the step S80 will be skipped.

In a case where the tempo-follow setting flag is in on-state, even if the melody part has a note-off event which should be processed in this timing, the corresponding melody tone will not be stopped. In the case where the tempo-follow setting flag is in on-state, by the above-described processing which is done during the waiting-reproduction, in response to the release of a key, the CPU 10 stops the melody tone corresponding to the released key.

In a case where it is determined in step S64 that the reproduction flag indicates that the song is not being reproduced in the waiting mode, in a case where it is determined in step S65 that the user has missed the timing before which the user is expected to depress the key, and in a case where the step S74 or the step S80 has completed, the interrupt process terminates to return to the process done before the interrupt process.

As described above, the electronic musical instrument 1 of the present invention is designed such that when the user depresses a key in the waiting-disabled mode, a musical tone having the tone pitch assigned to the depressed key starts being generated (the step S12 of the main process), while by the release of the key, the generation of the musical tone having the tone pitch assigned to the key stops (the step S14 of the main process). On the electronic musical instrument 1, furthermore, when a song provided for use in reproduction is reproduced, the normal reproduction of the song is done by the steps S61 to S63 of the interrupt process.

In a case where the electronic musical instrument 1 is in the waiting mode with the "tempo-follow setting disabled" setting, the guide lamp illuminates, by the steps S68 to S70 of the interrupt process, at a point in time which is earlier by the tone-generation start allowable period (the allowable time #1) than the note-on timing of a melody tone of the song provided for use in reproduction. In a case where the user depresses a correct key within the tone-generation start allowable period, the guide lamp is distinguished with the currently guided melody tone being generated (the steps S32 to S39 of the process done during the waiting-reproduction). Even if the key is released, the musical tone having the tone pitch assigned to the key will not be stopped. More specifically, the generation of the musical tone of the tone pitch assigned to the key is stopped at the note-off timing of the melody tone (the steps S71, S72 of the interrupt process). In a case where the user does not depress the correct key, the steps S31 to S40 of the process done during the waiting-reproduction are repeated to wait for the user's depression of the correct key. During waiting for the depression of the correct key, the value of the reproduction counter remains at one clock preceding value (the step S65 of the interrupt process). Therefore, if a user depresses a key during waiting for a depression of the correct key, the user's key-depression is considered to be a key-depression within the allowable period (the step S32 of the process done during the waiting-reproduction). In a case where the key depressed by the user is the correct key, the guide lamp is distinguished with the currently guided melody tone being generated (the steps S33 to S39 of the process done during the waiting-reproduction). In the above-described musical performance guide mode, the electronic musical instrument 1 waits until the user depresses a correct key with the tone-generation start allowable period of the allowable time #1 which is shorter than the allowable time #2. For a user of a low level of proficiency who desires to learn the timing at which the user is expected to depress keys, therefore, the electronic musical instrument 1 of the present invention which is in the above-described musical performance guide mode provides precise timing at which the user is expected to depress the keys.

In a case where the electronic musical instrument 1 is in the waiting mode with the "tempo-follow setting enabled" setting, the guide lamp illuminates, by the steps S76 to S78 of the interrupt process, at a point in time which is earlier by the tone-generation start allowable period (the allowable time #2) than the note-on timing of a melody tone of the song provided for use in reproduction. In a case where the user depresses a correct key within the tone-generation start allowable period, the guide lamp is distinguished with the currently guided melody tone being generated (the steps S44 to S47 of the process done during the waiting-reproduction). In accordance with the time interval between correct key-depressions and the note length of corresponding musical performance data, furthermore, a tempo is calculated to change the tempo of the song to the calculated tempo (the steps S48 to S49 of the process done during the waiting-reproduction). When the key is released, the generation of the musical tone whose tone pitch is assigned to the released key is stopped (the steps S54 to S56 of the process done during the waiting-reproduction). In a case where the user does not depress the correct key, the steps S43 to S57 of the process done during the waiting-reproduction are repeated to wait for the user's depression of the correct key. During waiting for the depression of the correct key, the value of the reproduction counter remains at one clock preceding value (the step S65 of the interrupt process). Therefore, if a user depresses a key during waiting for a depression of the correct key, the user's key-depression is considered to be a key-depression made within the allowable period (the step S44 of the process done during the waiting-reproduction). In a case where the key depressed by the user is the correct key, the guide lamp is distinguished with the currently guided melody tone being generated (the steps S45 to S53 of the process done during the waiting-reproduction). In the above-described musical performance guide mode, the electronic musical instrument 1 waits until the user depresses a correct key with the tone-generation start allowable period of the allowable time #2 which is longer than the allowable time #1. In the above-described musical performance guide mode, therefore, the electronic musical instrument 1 allows the user to depress a key to generate a musical tone even if the timing to generate the musical tone has not come yet without regarding the depression of the key as a failed depression.

On the above-described electronic musical instrument of the present invention, the switching of the tone-generation start allowable period is linked with the switching of the tempo-follow setting between on and off. However, the electronic musical instrument may be designed to allow the user to independently change only the tone-generation start allowable period. By providing a tone-generation start allowable period setting switch, for example, the electronic musical instrument may switch between the allowable time #1 and the allowable time #2 at each manipulation of the switch.

Although the electronic musical instrument which provides the musical performance guide of the present invention is a keyboard instrument, the electronic musical instrument is not limited to this embodiment, but may be applied to various kinds of electronic musical instruments having musical performance operating elements.

In the present invention, furthermore, the guide lamps are provided near or inside the keys to realize the guide capability. However, the guide capability of the present invention is not limited to this embodiment, but may be realized by software by displaying the guide on a keyboard illustration or a musical score displayed on a display device. By displaying the guide on an externally connected personal computer, or displaying the guide on an externally connected musical instrument having guide lamps, furthermore, the guide capability of the present invention may be realized on an external apparatus.

As for the setting of the above-described allowable time #1, the allowable time #1 (Ta') may be set at zero, because the musical performance guide may be provided at exact timing in order to help a user learn the correct timing. Actually, however, there exists a small time lag between the user's perception of the guide lamp and the user's depression of a corresponding key. Therefore, it is preferable to have the allowable time #1 which is equivalent to the time lag. As for the setting of the allowable time #2, it is preferable that the allowable time #2 is long so that a user can play a song freely. However, if the allowable time #2 is too long (if the guide for a melody tone starts at a point earlier by more than one bar, for example), the guide for the melody tone has to start even before the previous tone appears, which ruins the sense of guide. In consideration of that point, therefore, the allowable time #2 is preferable to be moderately long. For example, the allowable time #2 may be set flexibly such as having the allowable time #2 which is equivalent to the note length of a sixteenth-note for a fast song having many sixteenth-notes, and having the allowable time #2 which is equivalent to the note length of a half note for a slow song having many half notes and whole notes.

Furthermore, the tempo calculation method of the present invention is not limited to the above-described tempo calculation, but may be calculated by picking up only the immediately preceding musical tone to divide the time interval between key-depressions by the note length of the musical tone to obtain the time length per beat to adopt the obtained time length as the tempo for use in the reading of the next data. Such calculation made for each musical tone can easily make abrupt changes in tempo. Furthermore, the tempo may be calculated on the basis of the sum of the time taken to play a few musical tones. By dividing the time taken to play the data of the immediately preceding bar by 4, for example, the length per beat is obtained to be used as the tempo for the next bar. Alternatively, it may be determined for each musical tone whether the depression of a key is earlier than the correct timing or not. In a case where the key-depression is earlier than the correct timing, more specifically, the tempo may be quickened at a predetermined rate. In a case where the key-depression is later than the correct timing, more specifically, the tempo may be slowed down at a predetermined rate. Such control enables gradual speedup and slowdown of the tempo, providing the user with natural adequate control of the tempo.

What is claimed is:

1. A method of providing a playing guide for a musical instrument having musical-performance operating elements operable by a user, a playing guide interface having a plurality of individual indicators, each assigned to one of the operating elements, and a microprocessor, the method, which is executable by the microprocessor, comprising:

a playing guide control step of controlling the playing guide interface to control the timing at which the indicators indicate the operating elements to be operated by the user for a song according to song data thereof;

a tone-generation start allowable period control step of setting a tone-generation start allowable period, which sets the timing as to when a tone, corresponding to the operating element indicated by the respective indicator of the playing guide interface, is allowed to begin generating; and a tempo-follow control step of:

enabling or disabling, based on a user selection, a tempo-follow mode that determines a playing tempo of the user based on the user's operation of the operating elements, and setting the tone-generation start allowable period longer when the tempo-follow control task is enabled than disabled.

2. The method according to claim 1, wherein:

the song data comprises note-on events, and the playing guide control step controls the indicators to indicate the operating elements sequentially according to the note-on events to indicate a next operating element to be operated after a preceding operating element has been operated.

3. The method according to claim 1, wherein the tempo-follow control step determines the playing tempo of the user based on the timing of the operation of the operating elements by the user and the timing controlled in the playing guide control step.

4. The method according to claim 3, wherein:

the song data includes note-on events, and the playing guide control step controls the indicators to indicate the operating elements to be operated corresponding to the respective note-on events at an earlier timing than the respective note-on events.

5. The method according to claim 1, wherein:

the musical instrument includes a tone generator, the song data includes note-off data, and the method further comprises:

a tone-generation control steps of:

controlling the tone generator to generate a tone corresponding to the operating element, indicated by the respective indicator as the operating element to be operated, operated by the user within the tone-generation start allowable period;

stopping the generated tone based on the setting made in the tempo-follow control step;

with the tempo-follow mode enabled, stopping the generated tone according to user's releasing of the operating element; and with the tempo-follow mode disabled, stopping the generated tone according to the respective note-off information.

6. The method according to claim 1, wherein:

the song data includes note-on events, and the playing guide control step controls the indicators to selectively emit light according to the note-on events.

7. A musical instrument comprising:

musical-performance operating elements operable by a user;

a playing guide interface having a plurality of individual indicators, each assigned to one of the operating elements; and a microprocessor programmed to provide:

a playing guide control task that controls the playing guide interface to control the timing at which the indicators indicate the operating elements to be operated by the user for a song according to song data thereof;

a tone-generation start allowable period control task that sets a tone-generation start allowable period, which sets the timing as to when a tone, corresponding to the operating element indicated by the respective indicator of the playing guide interface, is allowed to begin generating; and a tempo-follow control task that:

enables or disables, based on a user selection, a tempo-follow mode that determines a playing tempo of the user based on the user's operation of the operating elements; and sets the tone-generation start allowable period longer when the tempo-follow control task is enabled than disabled.

8. The musical instrument according to claim 7, further comprising:

a tone generator;

wherein the microprocessor is further programmed to provide a tone-generation control task that controls the tone generator to generate a tone corresponding to the operating element, indicated by the respective indicator as the operating element to be operated, operated by the user within the tone-generation start allowable period.

9. The musical instrument according to claim 7, wherein:

the song data includes note-off data, and the tone-generation control task:

stops the generated tone based on the setting made in the tempo-follow control task, with the tempo-follow mode enabled, stops the generated tone according to user's releasing of the operating element; and with the tempo-follow mode disabled, stops the generated tone according to the respective note-off information.

10. The musical instrument according to claim 8, wherein:

the song data includes note-on events, and the playing guide control task controls the indicators to indicate the operating elements to be operated corresponding to the respective note-on events at an earlier timing than the respective note-on events.

11. The musical instrument according to claim 7, wherein:

the song data includes note-on events, and the playing guide control task controls the indicators to selectively emit light according to the note-on events.

12. The musical instrument according to claim 7, wherein:

the song data comprises note-on events, and the playing guide control task controls the indicators to indicate the operating elements sequentially according to the note-on events to indicate a next operating element to be operated after a preceding operating element has been operated.

13. The musical instrument according to claim 7, wherein the tempo-follow control task determines the playing tempo of the user based on the timing of the operation of the operating elements by the user and the timing controlled by the playing guide control task.

14. A musical instrument comprising:

a tone generator;

musical-performance operating elements operable by a user;

a playing guide interface having a plurality of individual indicators, each assigned to one of the operating elements; and a microprocessor programmed to provide:

a playing guide control task that controls the playing guide interface to control the timing at which the indicators indicate the operating elements to be operated by the user for a song according to song data thereof;

a tempo-follow control task that determines a playing tempo of the user based on the user's operation of the operating elements;

a tone-generation control task that controls the tone generator to:

generate a tone corresponding to the operating element, indicated by the respective indicator as the operating element to be operated, operated by the user;

stop generating the tone based on the playing tempo determined by the tempo-follow control task, which is based on the user's releasing of the operating element.

15. The musical instrument according to claim 14, wherein:

the microprocessor is further programmed to provide a tone-generation start allowable period control task that sets a tone-generation start allowable period, which sets the timing as to when a tone, corresponding to the operating element indicated by the respective indicator of the playing guide interface, is allowed to begin generating, and the tone-generation control task controls the tone generator to generate the tone corresponding to the operating element, indicated by the respective indicator of the playing guide interface, operated by the user within the tone-generation start allowable period.

* * * * *